United States Patent [19]
Ohnuma et al.

[11] Patent Number: 5,658,057
[45] Date of Patent: Aug. 19, 1997

[54] HYDRAULIC BRAKING APPARATUS HAVING HYDRAULIC PRESSURE CONTROL VALVE AND ELECTRICALLY CONTROLLED DEVICE TO CONTROL THE PRESSURE CONTROL VALVE

[75] Inventors: Yutaka Ohnuma, Numazu; Kenji Shirai, Mishima; Fumiaki Kawahata; Kiyoharu Nakamura, both of Toyota, all of Japan; Mark Evans, Mountain View, Calif.; Hiroaki Yoshida, Susono, Japan

[73] Assignee: Toyota Jidosha Kabushiki Kaisha, Aichi, Japan

[21] Appl. No.: 653,974

[22] Filed: May 28, 1996

Related U.S. Application Data

[63] Continuation of Ser. No. 229,796, Apr. 19, 1994, abandoned.

[30] Foreign Application Priority Data

Apr. 22, 1993 [JP] Japan ................................. 5-120686
Apr. 28, 1993 [JP] Japan ................................. 5-125238

[51] Int. Cl.$^6$ ............................................. B60T 8/36
[52] U.S. Cl. ................... 303/119.2; 303/116.2; 303/117.1; 303/DIG. 2
[58] Field of Search ................... 303/10, 13, 14, 303/113.1, 113.2, 115.1, 115.2, 116.1, 116.2, 117.1, 119.2, DIG. 2

[56] References Cited

U.S. PATENT DOCUMENTS

| | | | |
|---|---|---|---|
| 4,755,008 | 7/1988 | Imoto et al. | 303/169 |
| 4,812,777 | 3/1989 | Shirai | 303/14 |
| 4,902,075 | 2/1990 | Uno et al. | 303/115.2 X |
| 5,129,714 | 7/1992 | Latarnik | 303/113.2 X |
| 5,221,129 | 6/1993 | Takasaki | 303/119.2 X |
| 5,273,348 | 12/1993 | Yagi et al. | 303/13 |
| 5,333,944 | 8/1994 | Shirai et al. | 303/116.2 |

FOREIGN PATENT DOCUMENTS

| | | | |
|---|---|---|---|
| 36 44 304 | 7/1987 | Germany . | |
| 40 34 839 | 3/1992 | Germany . | |
| 63-20256 | 1/1988 | Japan . | |
| 4-69472 | 3/1992 | Japan . | |
| 2230067 | 10/1990 | United Kingdom | 303/113.2 |
| 92/07743 | 5/1992 | WIPO . | |

OTHER PUBLICATIONS

ATE–Bremsen–Handbuch 9.1 Auglage Autohaus Verlag GmbH, Ottobrunn 1998, pp. 223–230.

*Primary Examiner*—Peter M. Poon
*Attorney, Agent, or Firm*—Oliff & Berridge

[57] ABSTRACT

A hydraulic braking apparatus for braking a vehicle wheel, wherein a pressure control valve is disposed between a master cylinder and a wheel brake cylinder, and between a reservoir and a hydraulic pressure source which is independent of the master cylinder and whose pressure is applied as a braking pressure to the wheel brake cylinder for braking the wheel. The pressure control valve controls the braking pressure as a function of the master cylinder pressure which is generated by the master cylinder, depending upon the operating force acting on a brake operating member. An electrically controlled pressure regulating device is provided for applying an electrically controlled force to the pressure control valve, to thereby regulate the braking pressure to be applied to the wheel brake cylinder.

21 Claims, 14 Drawing Sheets

HYDRAULIC BRAKING APPARATUS HAVING HYDRAULIC PRESSURE CONTROL VALVE AND ELECTRICALLY CONTROLLED DEVICE TO CONTROL THE PRESSURE CONTROL VALVE

This is a Continuation of Application Ser. No. 08/229,796 filed Apr. 19, 1994, now abandoned.

BACKGROUND OF THE INVENTION

1. Field of the Invention

The present invention relates to a hydraulic braking apparatus for a vehicle wheel wherein the hydraulic pressure in a brake cylinder for the wheel is electrically controlled, and more particularly to improvements in operating reliability of such hydraulic braking apparatus.

2. Discussion of the Prior Art

For braking a wheel of a motor vehicle, there is known a hydraulic braking apparatus in which the hydraulic pressure generated by a hydraulic pressure source is electrically controlled to a level corresponding to an operating amount of a brake operating member such as a brake pedal, and the thus controlled hydraulic pressure is applied to a brake cylinder for braking the vehicle wheel. An example of such hydraulic braking apparatus is disclosed in JP-A-63-20256 (published in 1988). This braking apparatus has a spool-type solenoid-operated pressure control valve.

Such spool-type solenoid-operated pressure control valve includes a spool which is slidably and substantially fluid-tightly received in a bore formed in a valve housing, and a force motor or solenoid whose coil is energized to produce an electrically controllable pilot force, so that the pilot force acts on the spool in one direction. The pressure control valve is adapted such that a reaction force or feedback force proportional to the output hydraulic pressure of the control valve acts on the spool in the direction opposite to the direction in which the pilot force acts on the spool. This pressure control valve is capable of regulating the hydraulic pressure of an appropriate hydraulic pressure source to a level proportional to the amount of an electric current applied to the coil of the force motor or solenoid.

The valve housing of the spool-type solenoid-operated pressure control valve indicated above has a high-pressure port connected to the hydraulic pressure source, a low-pressure port connected to a reservoir, and an output port connected to a brake cylinder for braking a vehicle wheel. The pilot force acts on the spool in the direction for fluid communication of the output port with the high-pressure port. The feedback force is generated based on the hydraulic pressure at the output port, and acts on the spool in the direction for fluid communication of the output port with the low-pressure port. The spool is moved to a position of equilibrium between the pilot force and the feedback force, whereby the hydraulic pressure of the hydraulic pressure source is controlled according to the amount of electric current applied to the coil. On the other hand, the force acting on the brake pedal (hereinafter referred to as "pedal depression force") is detected by a suitable force sensor, while the deceleration value of the vehicle is detected by a deceleration sensor. The electric current for energizing the coil is determined so that the hydraulic pressure to be applied to the brake cylinder permits the detected vehicle deceleration value to coincide with a desired value which corresponds to the pedal depression force. This manner of controlling the pressure of the wheel brake cylinder is called herein "braking-effect monitoring brake control". In a modified arrangement, the hydraulic pressure in the wheel brake cylinder is detected, so that the energization current applied to the coil is controlled to regulate the detected hydraulic pressure to a desired level that establishes the desired vehicle deceleration value corresponding to the pedal depression force.

In the known hydraulic braking apparatus using the spool-type solenoid-operated pressure control valve constructed as described above, the hydraulic pressure of the wheel brake cylinder is electrically controlled on the basis of an output signal of the sensor such as the vehicle deceleration sensor or hydraulic pressure sensor. Upon failure of the sensor, however, the hydraulic pressure of the wheel brake cylinder would not be adequately controlled, that is, the controlled hydraulic pressure would be excessively high or low in relation to the operating force acting on the brake pedal or brake operating member.

SUMMARY OF THE INVENTION

It is therefore an object of the present invention to provide a hydraulic braking apparatus for a wheel of a vehicle, which assures improved operating reliability, with a minimum of an adverse influence of abnormality of electric control means associated with the apparatus.

The above object may be hydraulic braking apparatus for braking a wheel of a vehicle, comprising (a) a brake operating member, (b) a master cylinder having a pressurizing chamber for generating a hydraulic master cylinder pressure depending upon an operating force acting on the brake operating member, (c) a hydraulically operated brake having a wheel brake cylinder for braking the wheel, (d) a reservoir, (e) a hydraulic pressure source, independent of the master cylinder, for generating a hydraulic pressure, and (f) a pressure control valve connected to the master cylinder, the wheel brake cylinder, the hydraulic pressure source and the reservoir, for controlling the hydraulic pressure of the hydraulic pressure source according to the master cylinder pressure so that the controlled hydraulic pressure is applied as a braking pressure to the wheel brake cylinder, the braking apparatus being characterized in that an electrically controlled pressure regulating device is provided for applying an electrically controlled force to the pressure control valve, to thereby regulate the braking pressure to be applied to the wheel brake cylinder.

In the hydraulic braking apparatus constructed according to the present invention as described above, an operation of the brake operating member causes the pressurizing chamber of the master cylinder to generate the master cylinder pressure which corresponds to the operating force acting on the brake operating member. In the meantime, the hydraulic pressure of the hydraulic power source is controlled by the pressure control valve according to the master cylinder pressure applied as a pilot pressure to the pressure control valve. That is, the hydraulic pressure of the hydraulic power source is controlled to a level corresponding to the operating force or depression force acting on the brake operating member, and the thus controlled hydraulic pressure is applied as a braking pressure to the wheel brake cylinder for braking the wheel. Thus, the braking pressure controlled by the pressure control valve is determined by the pilot pressure, namely, the master cylinder pressure. In this sense, the pressure control valve is a pilot-operated pressure control valve, and the master cylinder functions as means for applying the pilot pressure to the pressure control valve.

According to the present invention, the braking pressure thus controlled by the pilot pressure received from the master cylinder can be further regulated by the electrically controlled pressure regulating device before it is applied to the wheel brake cylinder. Thus, the braking pressure can be eventually controlled to a level which is not proportional to the operating force acting on the brake operating member. Accordingly, the present braking apparatus is capable of effecting an anti-lock control or a braking-effect control of the braking pressure during braking of the vehicle, or a traction control of the driving wheel during acceleration of the vehicle. In the traction control mode, the braking pressure is applied to the wheel brake cylinder, without an operation of the brake operating member, and the pilot pressure is not applied to the pressure control valve, whereby the regulation of the braking pressure is not effected by the pressure control valve. For the traction control of the driving wheel, the braking pressure applied to the wheel brake cylinder for braking the driving wheel is regulated by the electrically controlled pressure regulating device, which adjusts the hydraulic pressure of the hydraulic pressure source as the braking pressure to be applied to the appropriate wheel brake cylinder.

According to the present invention as described above, the hydraulic braking pressure to be applied to the wheel brake cylinder during braking of the vehicle is principally controlled according to the pilot pressure based on the operating force or amount of the brake operating member, while the electrically controlled pressure regulating device is used as secondary means for controlling the braking pressure, namely, to effect the anti-lock control or braking-effect monitoring control of the braking pressure. Accordingly, a failure of an electric system including the electrically controlled pressure regulating device will have a minimum influence on the braking performance of the braking apparatus. In this respect, the present braking apparatus has improved operating reliability.

In one preferred form of the present invention, the hydraulic braking apparatus further comprises a pressure restricting device disposed between the master cylinder and the pressure control valve, for reducing a rate of increase of the pilot pressure to be applied to the pressure control valve after the master cylinder pressure exceeds a preset level. The term "reducing a rate of increase of the pilot pressure" is interpreted to mean not only reduction of the rate of increase of the pilot pressure, but also zeroing the rate of increase, that is, inhibiting a further increase of the pilot pressure after the master cylinder pressure exceeds the present level. In either case, the rate of increase of the pilot pressure is reduced after the master cylinder pressure exceeds the present level, as compared with that before the master cylinder pressure reaches the preset level. This arrangement makes it possible to reduce the hysteresis of the braking pressure which is produced by the pressure control valve and which is applied to the wheel brake cylinder, without increasing the size of the electrically controlled pressure regulating device, for the reason which will be apparent from the detailed description of preferred embodiments of this invention. Accordingly, the present braking apparatus has excellent operating response characteristics.

Where the pressure restricting device is provided as described above, and where the master cylinder has a plurality of mutually independent pressurizing chambers while the hydraulically operated brake has a plurality of wheel brake cylinders for braking respective wheels of the vehicle, one of the pressurizing chambers and at least one of the wheel brake cylinders constitute part of a first brake system, while another of the pressurizing chambers and at least another of the wheel brake cylinders constitute part of a second brake system. In this case, the first brake system preferably incorporates the pressure control valve, the electrically controlled pressure regulating device and the pressure restricting device, and it is desirable to provide an influencing device which influences the pressure restricting device so as to deteriorate the function of the pressure restricting device when the first brake system fails to normally operate to apply the braking pressure to its wheel brake cylinder or cylinders. In other words, upon failure of the second brake system, the influencing device either inhibits the pressure restricting device from limiting the rate of increase of the pilot pressure in the first brake system even when the master cylinder pressure in the first brake system exceeds the present level, or influences the pressure restricting device so as to reduce the degree of reduction of the rate of increase of the pilot pressure after the master cylinder pressure in the first brake system exceeds the present level. In either case, the braking pressure in the first brake system after the pilot pressure in the first brake system exceeds the present level is made higher when the second brake system is not normally operative to apply the braking pressure to its wheel brake cylinder or cylinders, than when the second brake system is normally operative.

The term "the first brake system fails to normally operate to apply the braking pressure to its wheel brake cylinder or cylinders" is interpreted to encompass a situation in which the braking pressure applied to the wheel brake cylinder(s) in the first brake system is lower than the normal level.

The above arrangement using the influencing device which acts on the pressure restricting device as described above permits an increase in the braking pressure in the first brake system when the first brake system does not normally function, as compared with the braking pressure when the first brake system is intact. Thus, the present arrangement makes it possible to reduce the required braking distance of the vehicle upon failure of the second brake system.

BRIEF DESCRIPTION OF THE DRAWINGS

The above and optional objects, features and advantages of the present invention will be better understood by reading the following detailed description of presently preferred embodiments, when considered in connection with the accompanying drawings, in which.

DETAILED DESCRIPTION OF THE PREFERRED EMBODIMENTS

Figure 1:
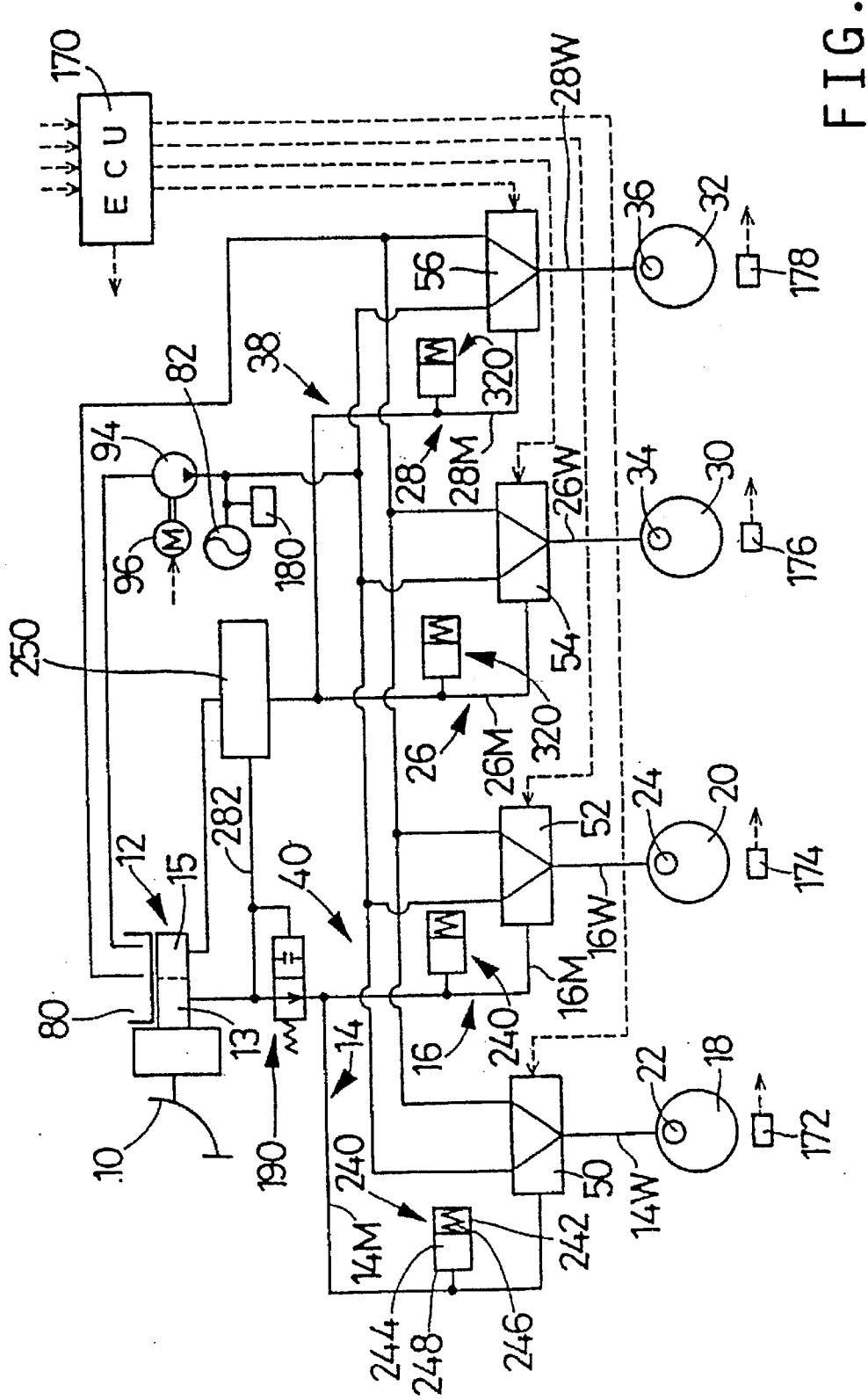
FIG. 1 is a schematic view of one embodiment of a hydraulic braking apparatus of the present invention.

Referring first to FIG. 1, there is schematically shown a hydraulic braking apparatus for a motor vehicle, wherein reference numeral 10 denotes a brake operating member in the form of a brake pedal provided on the vehicle. With this brake pedal 10 depressed, hydraulic pressure is developed in two mutually independent pressurizing chambers 13 and 15 of a master cylinder 12. The pressurizing chamber 13 is connected to two brake cylinders 22, 24 of front brakes provided for a left front and a right front wheel 18, 20, through respective fluid passages 14, 16, for braking these front wheels 18, 20. The fluid passage 16 is a branch line connected to the fluid passage 14, which in turn is connected to the pressurizing chamber 13. Similarly, the other pressurizing chamber 15 is connected to two brake cylinders 34, 36 of rear brakes provided for a left rear and a right rear wheel 30, 32, through respective fluid passages 26, 28, for braking these rear wheels 30, 32. The fluid passage 28 is a branch line connected to the fluid passage 26, which in turn is connected to the pressurizing chamber 15.

In the present embodiment, the pressurizing chamber 15 and rear wheel brake cylinders 34, 36 constitute part of a first brake system, while the pressurizing chamber 13 and front wheel brake cylinders 22, 24 constitute part of a second brake system. The pressurizing chambers 15 and 13 serve as a first and a second pressurizing chamber, respectively. The rear wheel brake cylinders 34, 36, and the front wheel brake cylinders 22, 24 serve as first and second pairs of wheel brake cylinders, respectively. The pressurizing chambers 13 and 15 will be hereinafter referred to as "front pressurizing chamber" and "rear pressurizing chamber", respectively, which generate hydraulic pressures hereinafter referred to as "a front master cylinder pressure" and "a rear master cylinder pressure", respectively.

The fluid passages 14, 16, 26, 28 are provided with respective hydraulic pressure control valves 50, 52, 54, 56, whereby each of those fluid passages 14, 16, 26, 28 is divided by the appropriate pressure control valve 50, 52, 54, 56 into two sections 14M, 16M, 26M, 28M (master cylinder side passages), and 14W, 16W, 26W, 28W (wheel brake cylinder side passages). Since the valves 50, 52, 54, 56 all have the same construction, the valve 50 will be described in detail, by way of example, by reference to FIG. 2.

Figure 2:
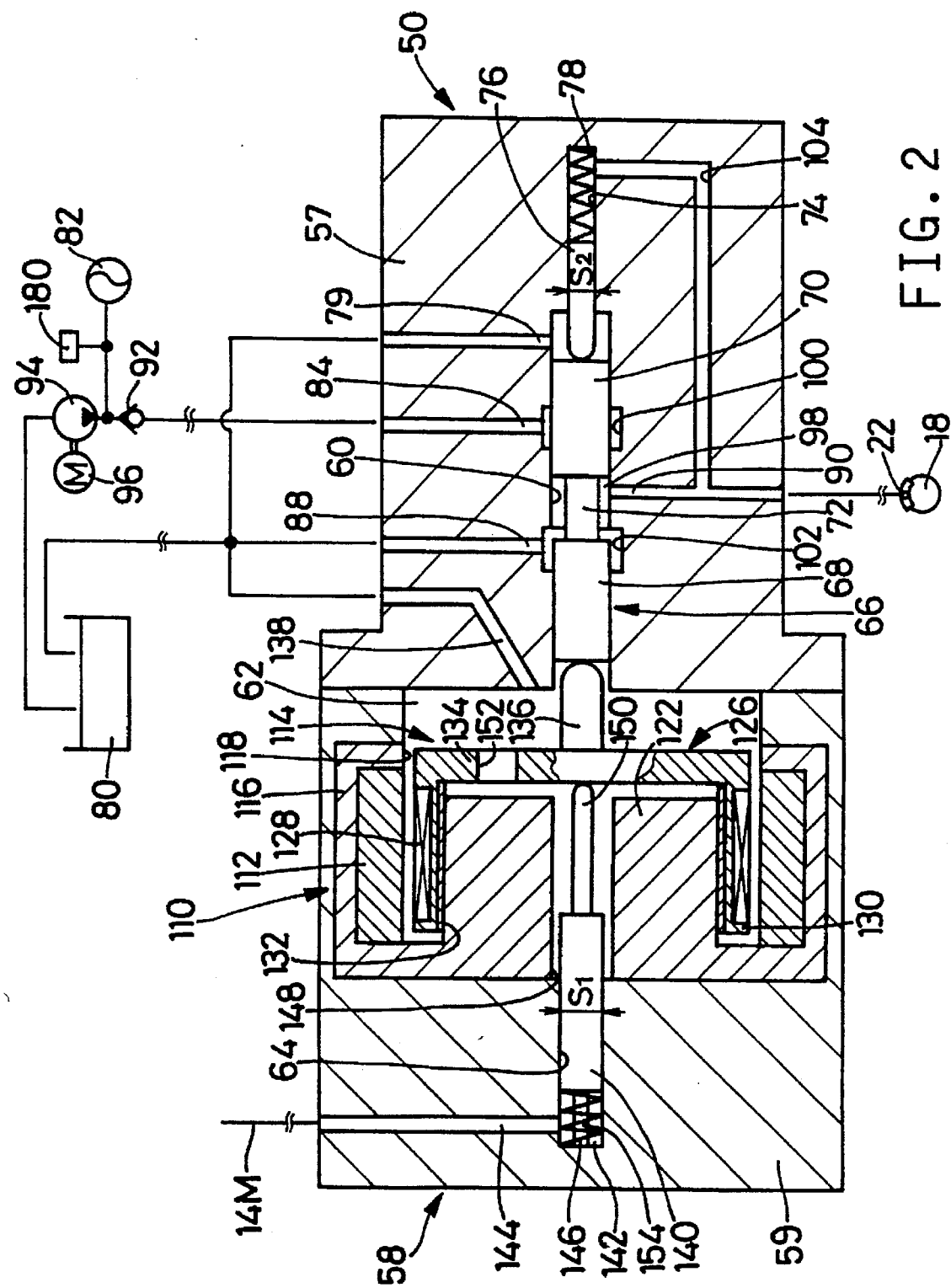
FIG. 2 is a front elevational view in cross section Showing a hydraulic pressure control valve and a force motor used in the braking apparatus of FIG. 1.

As shown in FIG. 2, the hydraulic pressure control valve 50 has a valve housing 57, which is integral with a housing 59 of a pilot force generator 58 which will be described. The valve housing 57 has a valve bore 60 with a circular cross sectional shape, which is closed at one end thereof (at the left-hand side end as seen in FIG. 2). The housing 59 of the pilot force generator 58 has a relatively large cylindrical space 62 which communicates with the open end of the valve bore 60, and also has a cylinder bore 64 which is open at one end thereof to the space 62, at the end of the space 62 remote from the valve bore 60. The cylinder bore 64 is closed at the other end. The valve bore 60, space 62 and cylinder bore 64 are formed concentrically with each other.

A spool 66 is substantially fluid-tightly and slidably received in the valve bore 60. The spool 66 is a rod having different diameters, that is, including a first land 68, a second land 70, and a small-diameter portion 72 formed between the two lands 68, 70. The spool 66 is fitted in the bore 60, at the first and second lands 68, 70, with a clearance as small as 10 μm (in diameter) with respect to the inner circumferential surface of the bore 60, whereby an intermetallic seal is provided between the outer and inner circumferential surfaces of the lands 68, 70 and bore 60.

The valve housing 57 further has a cylinder bore 74 which has a smaller diameter than the valve bore 60 and which communicates with the open end of the bore 60. A reaction piston or pin 76 is substantially fluid-tightly and slidably fitted in the cylinder bore 74, so as to provide an intermetallic seal between the reaction piston 76 and the bore 74. The reaction piston 76 is biased by a spring 78 in a direction toward the valve bore 60, and is thus held in abutting contact with the corresponding end face of the spool 66. This end face of the spool 64 and the end portion of the valve bore 60 in which the reaction piston 76 projects under the biasing action of the spring 78 cooperate to define a chamber which is connected to a reservoir 80 through a first low-pressure port 79 also formed in the housing 57.

The valve housing 57 further has a high-pressure port 84 connected to a hydraulic pressure source in the form of an accumulator 82, a second low-pressure port 88 connected to the reservoir 80, and an output port 90 connected to the front wheel brake cylinder 22 through the wheel brake cylinder side fluid passage 14W. The high-pressure port 84 is connected to the accumulator 82 through a check valve 92, which allows a flow of a brake fluid therethrough in a direction from the accumulator 82 toward the high-pressure port 84 but inhibits a flow of the brake fluid in the opposite direction. The accumulator 82 stores the brake fluid which is pressurized by a pump 94 that is driven by a drive motor 96 and connected to the reservoir 80.

The output port 90 communicates with an annular chamber 98 defined by the circumferential surface of the small-diameter portion 72 and the opposite end faces of the two lands 68, 70 of the spool 66 and the inner circumferential surface of the bore 60. The high-pressure port 84 communicates with an annular groove 100 formed between the output port 90 and the closed end of the valve bore 60. The second low-pressure port 88 communicates with an annular groove 102 formed between the output port 90 and the open end of the bore 60. The annular grooves 100 and 102 are both open to the bore 60.

The end face of the reaction piston 76 and the closed end of the cylinder bore 74 cooperate to define a chamber connected to a fluid passage 104 connected to the output port 90. The reaction piston 76 receives the hydraulic pressure of the output port 90, to thereby generate a feedback force corresponding to the hydraulic pressure to be applied to the brake cylinder 22. This feedback force acts on the spool 66 so as to move the spool 66 in the direction for cutting the fluid communication between the high-pressure port 84 and the output port 90. The reaction piston 76 and the fluid passage 104 cooperate to provide feedback means for producing the feedback force which acts on the spool 60.

In the cylindrical space 62, there is disposed an electromagnetic actuator in the form of a force motor 110 which includes a permanent magnet 112 and a moving coil member 114. Described more specifically, a yoke 116 is fixed in the space 62, and has a central cylindrical portion 122 that defines an inside diameter of an annular space 118. The permanent magnet 112 takes a form of a ring fixed to the yoke 116 such that the inner circumferential surface of the magnet ring 112 defines an outer diameter of the annular space 118. The moving coil member 114 consists of a holder 126 made of a non-magnetic material, and a coil 128 fixed to the holder 126. The holder 126 has a cylindrical portion 130 disposed in the annular space 118, and a bottom portion 134 which closes one of opposite axial ends of the cylindrical portion 130. The coil 128 is wound on the outer circumferential surface of the cylindrical portion 130. The holder 126 is slidably fitted, at its cylindrical portion 130, on the central cylindrical portion 122 of the yoke 116 through a bushing 132, which is fixed to the inner circumferential surface of the cylindrical portion 130. The bushing 132 is formed of a material having a sufficiently low friction coefficient. Thus, the moving coil member 114 including the coil 128 is slidably supported and guided by the cylindrical portion 122 of the yoke 116. The bottom portion 134 of the holder 126 has a projection 136 extending therefrom toward the spool 60. The cylindrical space 62 is connected to the reservoir 80 through a drain port 138 formed in the housing 57.

In the cylinder bore 64 formed in the housing 59 of the pilot force generator 58, there is fitted a pilot piston 140 substantially fluid-tightly and slidably, such that an intermetallic seal is provided between the pilot piston 140 and the bore 64. The closed end of the bore 64 and the corresponding end face of the pilot piston 140 cooperate to define a pilot pressure chamber 142 connected to the front pressurizing chamber 13 through a port 144 and the master cylinder side passage 14M. A spring 146 is disposed in the pilot pressure chamber 142, to bias the pilot piston 140 toward the yoke 116. The pilot piston 140 has a first extension 150 extending from its end face remote from the fluid chamber 142. Under the biasing action of the spring 146, the end portion of the pilot piston 140 remote from the spring 146 projects into a center bore 148 formed through the cylindrical portion 122 of the yoke 116, with the first extension 150-contacting at its free end with the bottom portion 134 of the holder 126. The center bore 148 communicates with the reservoir 80 through a hole 152 formed through the bottom portion 134, and the drain port 138, so that the center bore 148 serves as an atmospheric chamber exposed to the atmosphere. The pilot piston 140 also has a second extension 154 extending into the pilot pressure chamber 142.

The spool 66, reaction piston 76, moving coil member 114 and pilot piston 140 are movable as an unit under the biasing forces of the two springs 78, 146, which act on the unit in the opposite directions. When the master cylinder pressure is not applied to the pilot chamber 142 and the coil 128 is placed in the de-energized state, the pilot piston 140 is held in abutting contact at the second extension 154 with the bottom wall of the cylinder bore 64, while the spool 66 is held in its original position of FIG. 2 in which the output port 90 communicates with the second low-pressure port 88.

When the master cylinder pressure is applied to the pilot chamber 142, the pilot piston 140 is advanced to apply the pilot force to the spool 66 via the moving coil member 114, which pilot force acts on the spool 66 in the direction for fluid communication of the output port 90 with the high-pressure port 84.

When the coil 128 of the force motor 110 is energized with an electric current applied thereto, the moving coil member 114 is moved in one of opposite axial directions. The direction of movement of the moving coil member 114 is switched by changing the direction of the electric current applied to the coil 128. The force produced by the energized force motor 110 acts on the spool 66 either in the same direction as the direction in which the pilot force produced by the pilot force generator 58 acts on the spool 66, or in the direction opposite to that of the pilot force. In the former case, the spool 66 is advanced, namely, moved in the right direction as seen in FIG. 2. In the latter case, the pilot piston 140 is retracted in the direction from the first extension 150 toward the second extension 154, to thereby permit the spool 66 to be retracted, namely, moved in the left direction as seen in FIG. 2.

When the force produced by energizing the force motor 110 is applied to the spool 66 or pilot piston 140 while the pilot force produced by the pilot piston 140 acts on the spool 66, the hydraulic pressure which is regulated by the hydraulic pressure control valve 50 and applied to the front wheel brake cylinder 22 is electrically adjusted or regulated by the force motor 110. Thus, the force motor 110 serves as an electrically controlled pressure regulating device for regulating the hydraulic pressure controlled by the control valve 50. While the pilot piston 140 is placed in its original position of FIG. 2 without the master cylinder pressure applied to the pilot pressure chamber 142, the pressure control valve 50 operates in the same manner as the known spool-type solenoid-operated hydraulic pressure control valve, by controlling the energization current applied to the coil 128 so as to apply the force to the spool 66 in the same direction as the pilot pressure, so that the hydraulic pressure received from the accumulator 82 is regulated to a level proportional to the energization current applied to the coil 128, and applied to the front wheel brake cylinder 22 via the output port 90.

The force produced by the force motor 110, which acts on the spool 66 or pilot piston 140, is proportional to the energization current of the coil 128. Accordingly, the pressure in the wheel brake cylinder 22 can be adjusted or regulated as needed, by suitably controlling the energization current of the coil 128 of the force motor 110.

The amount of the energization current applied to the coil 128 of the force motor 110 is controlled by an electronic control unit 170 (hereinafter referred to as "ECU 170"). The ECU 170 receives output signals of wheel speed sensors 172, 174, 176, 178 for detecting the rotating speeds of the left and right front wheels 18, 20 and the left and right rear wheels 30, 32, respectively, so that the ECU 170 calculates various parameters such as the speeds of the wheels 18, 20, 30, 32, the deceleration value of the vehicle and the running speed of the vehicle, on the basis of the received output signals. The sensors 172, 174, 176, 178 may be used as a slip detecting device for detecting slipping conditions of the wheels on the road surface. The ECU 170 also receives an output signal of a pressure sensor 180 for detecting the hydraulic pressure in the accumulator 180, so that the pump motor 94 is turned on and off according to the output signal of the pressure sensor 180, so as to maintain the pressure of the accumulator 82 within a predetermined range.

Figure 3:
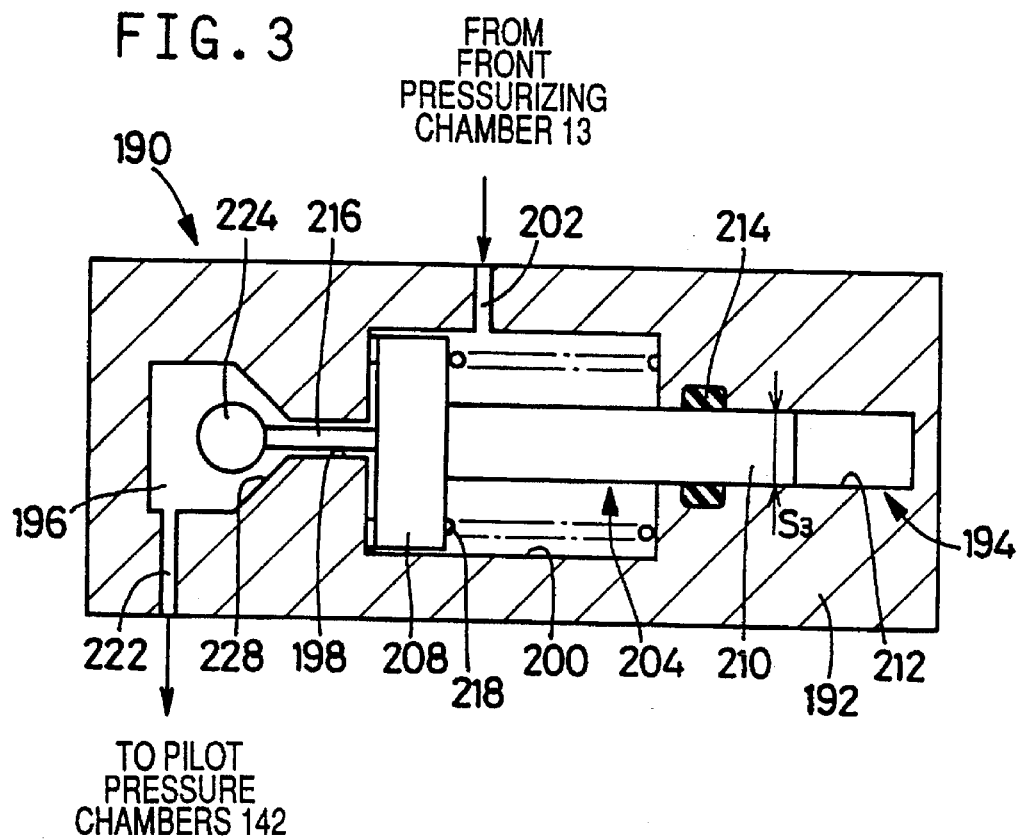
FIG. 3 is front elevational view in cross section of a limit valve used in the braking apparatus of FIG. 1.

In a portion of the fluid passage 14 between the front pressurizing chamber 13 of the master cylinder 12 and the point at which the fluid passage 16 is connected, there is disposed a limit valve 190 in the form of a pilot-operated shut-off valve which serves as a pressure restricting device, the function of which will be understood from the following description. As shown in FIG. 3, the limit valve 190 has a valve housing 192 in which there are formed concentrically a cylinder bore 194, a valve chamber 196, and a communication hole 198 communicating with the cylinder bore 194 and valve chamber 196.

The cylinder bore 194 has different diameters including a diameter of a large-diameter portion 200 which communicates with the front pressurizing chamber 13 through a port 202. A stepped limiter piston 204 is slidably received in the cylinder bore 194. The limiter piston 204 includes a large-diameter portion 208 which is loosely fit in the large-diameter portion 200 of the bore 194. The limiter piston 204 also includes a small-diameter portion 210 which is fluid-tightly slidable in a small-diameter portion 212 of the bore 194, with a fixed O-ring 214 slidably engaging the portion 210. The large-diameter portion 208 of the limiter piston 204 has an extension 216 extending through the communication hole 198. The limiter piston 204 is biased by a spring 218 disposed within the large-diameter portion 200 of the bore 194, whereby the biasing force of the spring 218 acts on the piston 204 in the direction that causes the piston 204 to be advanced, that is, in the direction that causes the extension 216 to project into the valve chamber 196.

The valve chamber 196 is connected to the pilot pressure chambers 142 of the pressure control valves 50 and 52, through the master cylinder side passages 14M, 16M, respectively. The extension 216 of the limiter piston 204 carries a ball 224 fixed at its free end. The ball 224, which is accommodated within the valve chamber 196, is adapted to be seated on a valve seat 228 formed at the end of the chamber 196 adjacent to the end of the communication hole 198 remote from the large-diameter portion 208. With the ball 224 seated on the seat 228, the large-diameter portion 200 Of the cylinder bore 194 and the valve chamber 196 are disconnected from each other. When no hydraulic pressure is developed in the front pressurizing chamber 13, the limiter piston 204 is placed in its original position of FIG. 3 under the biasing force of the spring 218. In this original position, the large-diameter portion 208 of the limiter piston 204 is in abutting contact with the end face of the large-diameter portion 200 in which the hole 198 is open, whereby the ball 224 is spaced apart from the valve seat 228, so that the front pressuring chamber 13 is held in fluid communication with the pilot pressure chambers 142 of the pressure control valves 50, 52.

A fluid absorber 240 is provided between a portion of each of the master cylinder side passages 14M, 16M between the pilot pressure chamber 142 and the limit valve 190. The fluid absorber 240 has a piston 244 fluid-tightly and slidably received in a housing 242. The piston 244 is biased by a spring 246 toward a fluid chamber 248 connected to the passage 14M, 16M.

Figure 4:
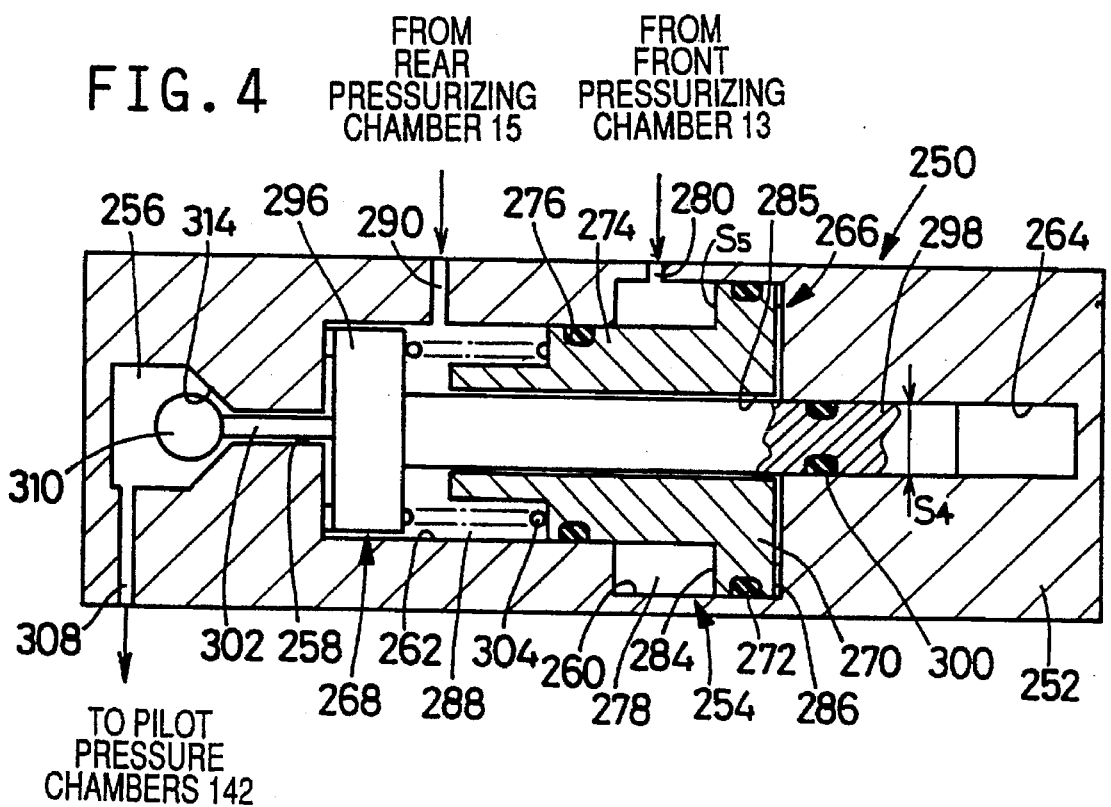
FIG. 4 is a front elevational view in cross section of a limit valve with a non-limit function used in the braking apparatus of FIG. 1.

A limit valve 250 in the form of a pilot-operated shut-off valve having a non-limit function is provided in a portion of the master cylinder side passage 26M between the master cylinder 12 and the point at which the master cylinder side passage 28M is connected. As shown in FIG. 4, this limit valve 250 has a valve housing 252 in which are concentrically formed a cylinder bore 254, a valve chamber 256, and a communication hole 258 communicating with the bore 254 and chamber 256. The cylinder bore 254 has different diameters, namely, a large-diameter portion 260, an intermediate-diameter portion 262 and a small-diameter portion 264. A non-limiter piston 266 and a limiter piston 268 are slidably received in the cylinder bore 254.

The non-limiter piston 266 is a stepped member having a large-diameter portion 270 which is slidably fitted in the large-diameter portion 260 of the cylinder bore 254, fluid-tightly by an O-ring 272. The non-limiter piston 266 also has a small-diameter portion 274 which is slidably fitted in the intermediate-diameter portion 262 of the bore 254, fluid-tightly by an O-ring 276. The large-diameter and small-diameter portions 270, 274 cooperate with the bore 254 to define an annular fluid chamber 278 in front of the large-diameter portion 270 (on the side of the small-diameter portion 274). The fluid chamber 278 is connected to the front pressurizing chamber 13 through a port 280 and a fluid passage 282 (FIG. 1). The large-diameter portion 270 has an annular face 284 exposed to the annular fluid chamber 278. This face 278 receives the hydraulic pressure generated by the front pressurizing chamber 13.

The non-limiter piston 266 has a center bore 285 aligned with its axis. The center bore 285 communicates with a fluid chamber 286 formed behind the large-diameter portion 270, and also communicates with a fluid chamber 288 which is formed within the intermediate-diameter portion 262 of the bore 254 and which is partially defined by the small-diameter portion 274 of the piston 266. The fluid chamber 288 is connected to the rear pressurizing chamber 15 through a port 290. Thus, the non-limiter piston 266 receives the hydraulic pressure of the rear pressurizing chamber 15, at the rear end face of the large-diameter portion 270 and the front end face of the small-diameter portion 274.

The limiter piston 268 is also a stepped member, which has a large-diameter portion 296 loosely fitted in the intermediate-diameter portion 262 of the cylinder bore 254. The limiter piston 268 further has a small-diameter portion 298 which is loosely fitted in the center bore 285 formed through the non-limiter piston 266. The small-diameter portion 298 is slidable in the center bore 285 fluid-tightly by an O-ring 300. The large-diameter portion 296 has an extension 302 extending through the communication hole 258, and is biased by a spring 304 disposed in the intermediate-diameter portion 262 (in the fluid chamber 288). The biasing force of the spring 304 acts on the limiter piston 268 in the direction that causes the piston 268 to be advanced, that is, to be moved in the direction that causes the extension 203 to project into the valve chamber 256.

The valve chamber 256 is connected to the pilot pressure chambers 142 of the pressure control valves 54, 56 through a port 308, and the respective master cylinder side passages 26M, 28M. The valve chamber 256 accommodates a ball 310 fixed to the free end of the extension 302. The ball 310 is adapted to be seated on a valve seat 314 formed at the end of the chamber 256 adjacent to the end of the communication hole 258 remote from the large-diameter portion 296. With the ball 310 seated on the seat 314, the intermediate-diameter portion 262 of the cylinder bore 254 and the valve chamber 256 are disconnected from each other. When no hydraulic pressure is developed in the front and rear pressurizing chambers 13, 15, the non-limiter piston 266 and the limiter piston 268 are placed in their original positions of FIG. 4 under the biasing action of the spring 304. In the original positions, the rear end face of the large-diameter portion 270 of the non-limiter piston 266 is held in abutting contact with the rear end face of the large-diameter portion 260 of the bore 254 on the side of the small-diameter portion 264, while the front end face of the large-diameter portion 296 of the limiter piston 268 is held in abutting contact with the front end face of the intermediate-diameter portion 262 of the bore 254 on the side of the communication hole 258. In this condition, the ball 310 is spaced away from the seat 314, whereby the rear pressurizing chamber 15 communicates with the pilot pressure chambers 142 of the pressure control valves 54, 56.

A fluid absorber 320 similar to the fluid absorber 240 described above is provided in a portion of each of the master cylinder side passages 26M, 28M between the limit valve 250 and the pressure control valve 54, 56.

There will be described an operation of the present braking apparatus.

When the brake pedal 10 is not operated, the spool 66, reaction piston 76, moving coil member 114 and pilot piston 140 of each hydraulic pressure control valve 50, 52, 54, 56 are placed in their original positions of FIG. 2. With the spool 66 placed in the original position, the output port 90 communicates with the second low-pressure port 88. On the other hand, the limit valve 190 and the limit valve 250 with the non-limit function are placed in the positions of FIGS. 3 and 4, respectively, whereby the front pressurizing chamber 13 communicates with the pilot pressure chambers 142 of the control valves 50, 52, while the rear pressurizing chamber 15 communicates with the pilot pressure chambers 142 of the control valves 54, 56.

Figure 5:
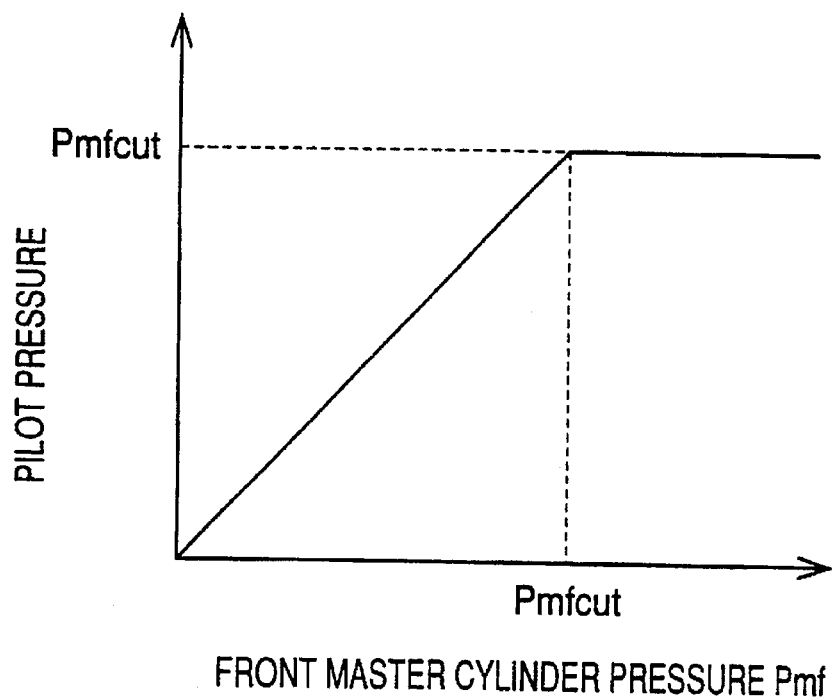
FIG. 5 is a graph for explaining the function of the limit valve of FIG. 3.

When the brake pedal 10 is depressed to brake the vehicle wheels 18, 20, 30, 32, hydraulic pressures are generated in the front and rear pressurizing chambers 13, 15 of the master cylinder 12. The front master cylinder pressure generated in the front pressurizing chamber 13 is applied via the limit valve 190 to the pilot pressure chambers 142 of the pressure control valves 50, 52. At this time, a biasing force Fs1 of the spring 218 acts on the limiter piston 204 in one of opposite axial directions, while a force Pmf S3 where Pmf and S3 represent the front master cylinder pressure and a cross sectional area of the small-diameter portion 210 acts on the limiter piston 204 in the other axial direction. When the front master cylinder pressure Pmf is lower than a preset level Pmfcut, the limiter piston 204 is not moved from the original position of FIG. 3, and the ball 224 is placed away from the valve seat 228, whereby the limit valve 190 permits the front master cylinder pressure Pmf to be applied to the pilot pressure chambers 142. Accordingly, the hydraulic pressure (pilot pressure) in the pilot pressure chamber 142 in each front hydraulic pressure control valve 50, 52 increases linearly with an increase in the front master cylinder pressure Pmf, until the pressure Pmf reaches the preset level Pmfcut, as indicated in the graph of FIG. 5. The present level Pmfcut will be described later.

A rear master cylinder pressure Pmr generated in the rear pressuring chamber 15 is applied via the limit valve 250 to the pilot pressure chambers 142 of the rear hydraulic pressure control valves 54, 56. At the same time, the front master cylinder pressure Pmf is applied to the annular fluid chamber 278 of the limit valve 250, while the rear master cylinder pressure Pmr is applied to the fluid chambers 286, 288. Since the front and rear master cylinder pressures Pmf and Pmr are equal to each other, the non-limiter piston 266 receives two equal forces based on the front and rear master cylinder pressures Pmf, Pmr. Since these forces act on the non-limiter piston 266 in the opposite directions, the non-limiter piston 266 remains in the original position of FIG. 4.

Figure 6:
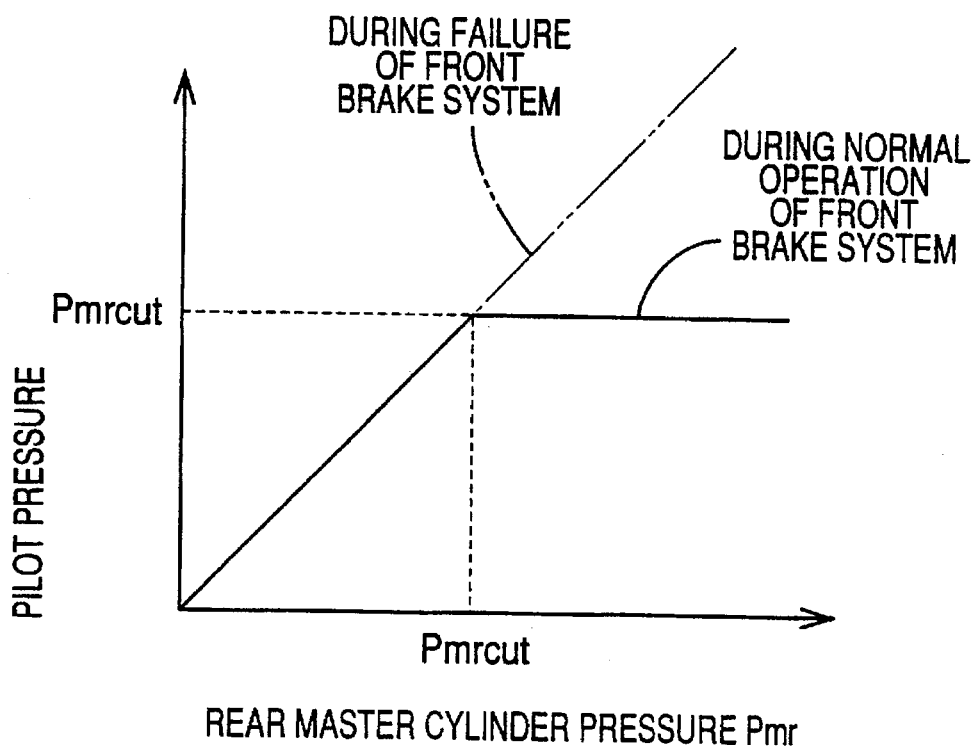
FIG. 6 is a graph for explaining the functions of the limit valve of FIG. 4.

Further, the limiter piston 268 receives a biasing force Fs2 of the spring 304, and a force Pmr.S4 where S4 represents a cross sectional area of the small-diameter portion 298. When the rear master cylinder pressure Pmr is lower than a preset level Pmrcut, the limiter piston 268 remains in the original position of FIG. 4, whereby the limiter piston 268 permits the rear master cylinder pressure Pmr to be applied to the pilot pressure chamber 142 of each rear pressure control valve 54, 56. Accordingly, the pilot pressure in the pilot pressure chamber 142 in each rear pressure control valve 54, 56 increases linearly with an increase in the rear master cylinder pressure Pmr, until the pressure Pmr reaches the preset level Pmrcut, as indicated in the graph of FIG. 6. The present level Pmrcut and the function of the non-limiter piston 266 will be described.

With the master cylinder pressure Pmf, Pmr applied to the pilot pressure chamber 142, the pilot piston 140 is advanced to thereby advance the spool 66 via the moving coil member 114, whereby the output port 90 is disconnected from the second low-pressure port 88. With a further advancing movement of the spool 66 by the pilot piston 140, the output port 90 is brought into communication with the high-pressure port 84, so that the pressurized brake fluid in the accumulator 82 is supplied to the wheel brake cylinder 22, 24, 34, 36. At the same time, the reaction or feedback force based on the fluid pressure applied to the wheel brake cylinder acts on the spool 66. The fluid pressure in the brake wheel cylinder 22, 24, 34, 36, namely, wheel brake cylinder pressure Pw is controlled according to the following equation:

$$Pw = (S1/S2)Pm \quad (1)$$

where,

S1: cross sectional area of pilot piston 140

S2: cross sectional area of reaction piston 76

Pm: master cylinder pressure (Pmf or Pmr).

It will be understood from the above equation (1) that the master cylinder pressure Pm is boosted to the wheel brake cylinder pressure Pw (to be applied to the wheel brake cylinder 22, 24, 34, 36), at a boosting ratio determined by the cross sectional areas S1 and S2 of the pilot and reaction pistons 140, 76. In other words, the hydraulic pressure received from the accumulator 82 is reduced to the wheel brake cylinder pressure Pw which corresponds to the depression force acting on the brake pedal 10. Since the master cylinder pressure Pm corresponds or is proportional to the depression force on the brake pedal 10, the wheel brake cylinder pressure Pw can be controlled to a level corresponding to the brake pedal depression force, by using the master cylinder pressure Pm as the pilot pressure which acts on the pilot piston 140 and therefore on the spool 66. That is, the wheel brake cylinder pressure Pw varies as a function of the pilot pressure acting on the pilot piston 140.

Thus, the master cylinder 12 functions as a device for applying a pilot pressure to the hydraulic pressure control valves 50, 52, 54, 56. Although the amount of the brake fluid used by the master cylinder 12 for this purpose is small, the provision of the fluid absorbers 240, 320 in the master cylinder side passages 14M, 16M, 26M, 28M permit the vehicle driver to have a good feeling in depressing the brake pedal 10. In the absence of the fluid absorbers 240, 320, the driver would have a feeling of hard depression on the brake pedal 10 if the amount of the fluid used to provide the pilot pressure is small. In the present embodiment, however, the fluid absorbers 240, 320 absorb a suitable amount of the fluid supplied from the master cylinder 12, and the vehicle driver is given a comfortable feeling upon depression of the brake pedal 10. Further, the rate of rise of the wheel brake cylinder pressure Pw with an increase in the operating amount of the brake pedal 10 can be made relatively low, making it possible to easily achieve an intricate control of the wheel brake cylinder pressure Pw by manipulation of the brake pedal 10.

If the slip ratio of a vehicle wheel exceeds an upper limit due to an excessive depression force acting on the brake pedal 10 in relation to the friction coefficient of the road surface on which the vehicle is running, the ECU 170 effects an anti-lock brake pressure control operation for that wheel. In this case, the ECU 170 energizes the coil 128 of the force motor 110 in the direction for producing a counter force that acts on the pilot piston 140 in the direction opposite to the direction in which the pilot force based on the pilot pressure in the pilot pressure chamber 142 acts on the pilot piston 140. As a result, the pilot piston 140 is retracted toward the pilot pressure chamber 142, whereby the spool 66 is retracted to a pressure-decrease position in which the output port 90 communicates with the second low-pressure port 88. Consequently, the wheel brake cylinder pressure Pw is lowered. As the amount of slip of the wheel decreases, the amount of the energization current of the coil 128 is reduced, whereby the pilot piston 140 is advanced to advance the spool 66 to a pressure-hold position in which the output port 90 communicates with neither the second low-pressure port 88 nor the high-pressure port 84, or to a pressure-increase position in which the output port 90 communicates with the high-pressure port 84. Consequently, the wheel brake cylinder pressure Pw is maintained or increased. During the anti-lock brake pressure control operation, the wheel brake cylinder pressure Pw is controlled according to the following equation (2):

$$Pw=(S1/S2)Pm+F1/S2 \qquad (2)$$

where,

F1: counter force (negative value) produced by force motor 110 and acting on the pilot piston 140.

As is apparent from the above equation (2), the wheel brake cylinder pressure Pw can be controlled by controlling the counter force F1, whereby the slip ratio of the wheel can be held within an optimum range.

The ECU 170 is also adapted to effect a traction control of the driving wheels (e.g., front wheels 18, 20) when the slip ratio of the driving wheel is excessive during acceleration of the vehicle, for example, upon starting of the vehicle on a road surface having a relatively low friction coefficient. Since the traction control of the driving wheels is effected while the brake pedal 10 is at rest, the pressure control valve 50, 52, 54, 56 is not operable with the pilot pressure in the pilot pressure chamber 142, and the hydraulic pressure received from the accumulator 82 is controlled only electrically by the force motor 110. Described in detail, the coil 128 of the force motor 110 is energized in the direction that causes the spool 66 to be moved in the direction in which the spool 66 is moved by the pilot piston 140 based on the pilot pressure. In this case, the hydraulic pressure received from the accumulator 82 is controlled to the wheel brake cylinder pressure Pw according to the following equation (3):

$$Pw=F2/S2 \qquad (3)$$

where,

F2: force (positive value) produced by the force motor 110 and acting on the spool 66.

The force F2 is proportional to the amount of the energization current applied to the coil 128. The driving wheel can be suitably braked so as to avoid an excessive slip of the wheel during acceleration of the vehicle, by controlling the energization current to thereby regulate the force F2 produced by the force motor 110.

When the depression force on the brake pedal 10 is so large that the master cylinder pressure Pmf, Pmr of the front or rear pressurizing chamber 13, 15 exceeds the preset level Pmfcut or Pmrcut, the limit valve 190, 250 inhibits a further increase in the pilot pressure in the pilot pressure chamber 142. That is, the upper limit of the pilot pressure is limited by the limit valve 190, 250.

In the limit valve 190, the limiter piston 204 is retracted to cause the ball 244 to be seated on the valve seat 228, when the force Pmf.S3 (front master cylinder pressure Pmf multiplied by the cross sectional area S3 of the small-diameter portion 210 of the limiter piston 204) which acts on the limiter piston 204 exceeds the biasing force Fs1 of the spring 218, during an increase in the front master cylinder pressure Pmf. As a result, the supply of the pressurized fluid from the front pressurizing chamber 13 to the pilot pressure chamber 142 is inhibited, whereby the pilot pressure in the pilot pressure chamber 142 is maintained at the preset level Pmfcut, namely, at the level at which the ball 224 is seated on the seat 228, as indicated in the graph of FIG. 5, even if the front master cylinder pressure Pmf is further increased due to a continuing depression on the brake pedal 10. The upper limit Pmfcut of the front master cylinder pressure Pmf at which a further increase in the pilot pressure is inhibited by the limiter piston 204 is determined according to the following equation (4):

$$Pmfcut=Fs1/S3 \qquad (4)$$

Similarly, the upper limit Pmrcut of the rear master cylinder pressure Pmr at which a further increase in the pilot pressure is inhibited by the limiter piston 268 of the limit valve 250 is determined according to the following equation (5):

$$Pmrcut=Fs2/S4 \qquad (5)$$

The upper limits Pmfcut and Pmrcut may be suitably selected by adjusting the biasing force 218, 304 and the cross sectional area S3, S4 of the small-diameter portion 210, 298. In the present embodiment, these upper limit values Pmfcut, Pmrcut are set at a maximum value necessary to effect an ordinary braking operation, more precisely, at a level slightly higher than a level above which the braking force decreases with the slip ratio of the wheel increasing and above which an anti-lock brake pressure control is required, in the case of vehicle braking on a dry asphalt road surface.

When the force motor 110 is operated to produce a counter force acting on the pilot piston 140 so as to retract the pilot piston 140 while the pilot pressure in the pilot pressure chamber 142 is maintained at the preset upper limit Pmfcut, Pmrcut by the limit valve 190, 250 in spite of the master cylinder pressure Pmf, Pmr exceeding the upper limit Pmfcut, Pmrcut, the brake fluid discharged from the pilot pressure chamber 142 due to a retracting movement of the pilot piston 140 is absorbed by the fluid absorber 240, 320.

Figure 7:
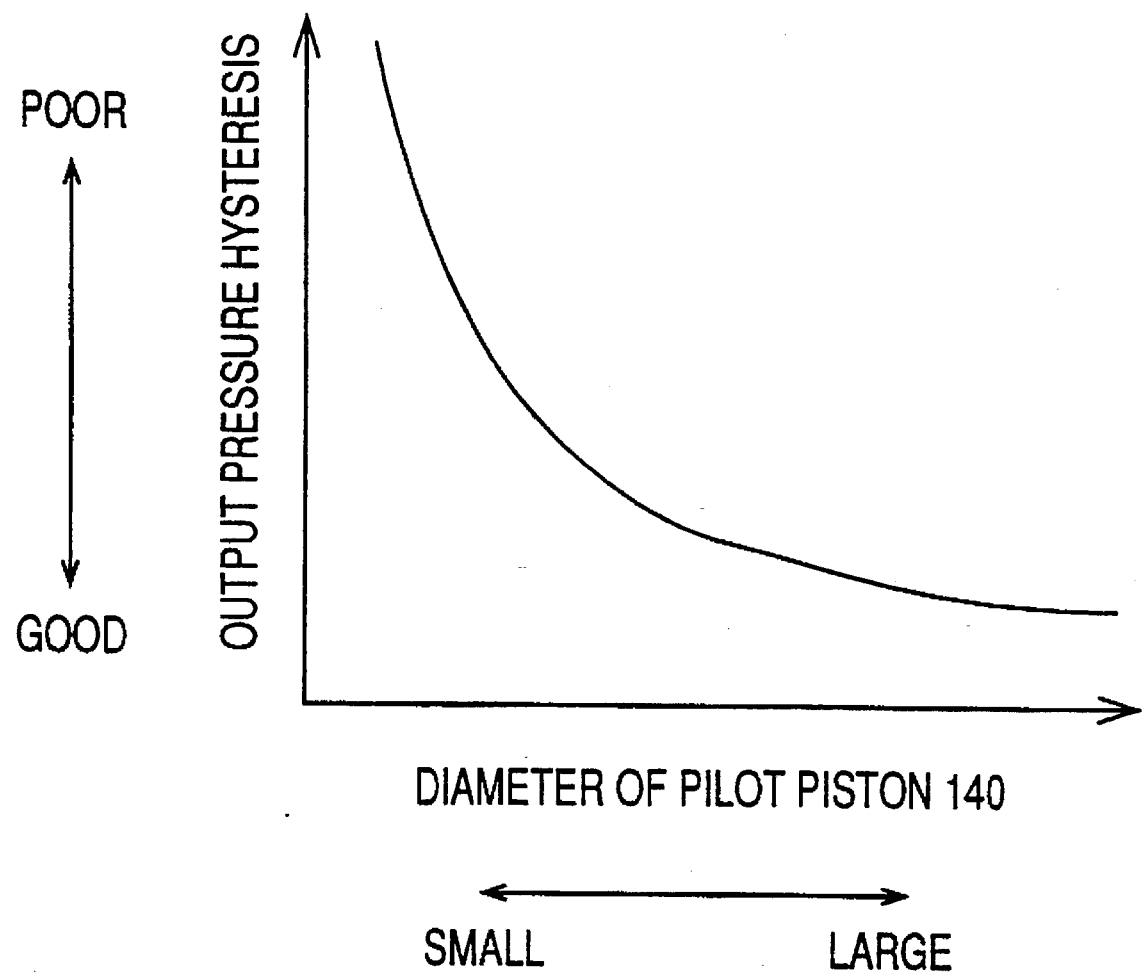
FIG. 7 is a graph indicating a relationship between a diameter of a piston and output pressure hysteresis of the pressure control valve.

Thus, the present hydraulic braking apparatus is adapted to prevent the application of an excessively high level of the master cylinder pressure Pmf, Pmr to the pilot pressure chamber 142 of the hydraulic pressure control valves 50, 52, 54, 56, so that these valves exhibit excellent input-output characteristics, with the valve structure having a relatively small size. As indicated in the graph of FIG. 7, the hysteresis of the output pressure produced at the output port 90 decreases with an increase in the diameter of the pilot piston 140. That is, the response of the pilot piston 140 is improved as its diameter increases. In this respect, it is noted that an increase in the diameter of the pilot piston 140 results in an increase in the pilot force of the pilot piston 140 acting on the spool 66 and also an increase in the friction resistance between the mating surfaces of the pilot piston 140 and the cylinder bore 64. However, the rate of increase in the pilot force is considerably higher than that of the friction resistance, and therefore an increase in the diameter of the pilot piston 140 facilitates the movement of the pilot piston against the friction resistance.

Accordingly, it is desirable to increase the diameter of the pilot piston 140 for the purpose of improving the input-output characteristics of the pilot piston 140. On the other hand, an increase in the diameter of the pilot piston 140 requires an increase in the size of the reaction piston 76 which produces the reaction or feedback force against the pilot force, and also an increase in the size of the force motor 110. While the size of the force motor 110 may be reduced with a decrease in the size of the pilot piston 140, this causes deterioration of the input-output characteristics of the pilot piston 140.

In view of the above facts, the present braking apparatus is arranged to limit the level of the pilot pressure to be applied to the pilot pressure chamber 142, so that the pilot force produced by the pilot piston 140 will not exceed a certain upper limit corresponding to the upper limit Pmfcut, Pmrcut of the master cylinder pressure Pm (Pmf, Pmr). This arrangement makes it possible to limit the pilot force without reducing the diameter of the pilot piston 140, and without increasing the size of the force motor 110. That is, the force motor 110 may be small-sized since the force produced by the force motor 110 is required to overcome the pilot force which has an upper limit corresponding to the pilot pressure that is limited by the limit valves 190, 250. Therefore, the present arrangement permits the pressure control valves 50, 52, 54, 56 to be small-sized while assuring excellent input-output characteristics.

There will next be described the non-limit function of the limit valve 250, namely, the function of the non-limiter piston 266.

If the second brake system fails due to a damage of its piping arrangement, and becomes incapable of applying the hydraulic pressure to the front wheel brake cylinders 22, 24, the hydraulic pressure cannot be applied to the annular fluid chamber 278 of the limit valve 250. As a result, the non-limiter piston 266 is moved toward the limiter piston against the biasing action of the spring 304. After the non-limiter piston 266 abuts on the limiter piston 268, a force Pmr-S5 and a force Pmr.S4 act on the limiter piston 266 in the opposite directions, where S5 and S4 represent the cross sectional area of the annular face 284 of the non-limiter piston 266 and the cross sectional area of the small-diameter portion 298 of the limiter piston 268, respectively. Therefore, with the area S5 of the annular face 284 selected to be larger than the area S4 of the small-diameter portion 298, the large-diameter portion 296 of the limiter piston 268 is held in abutting contact with the end face of the intermediate-diameter portion 262 of the cylinder bore 254, and the ball 310 is prevented from being seated on the valve seat 314. In this condition, the rear master cylinder pressure Pmr can be applied to the pilot pressure chamber 142 even after the pressure Pmr reaches the preset level Pmrcut, whereby the pilot pressure in the pilot pressure chamber 142 rises linearly with an increase in the rear master cylinder pressure Pmr, even after the pressure Pmr exceeds the upper limit Pmrcut, as indicated by two-dot chain line in the graph of FIG. 6. Thus, the pressure limit function of the limiter piston 268 is inhibited by the non-limit function of the non-limiter piston 266.

It will be understood from the above description of the limit valve 250 that the limiter piston 268, ball 310, seat 314 and spring 304 cooperate to constitute a pressure restricting device for reducing a rate of increase of the pilot pressure (i.e., master cylinder pressure Pm) after the master cylinder pressure Pm exceeds a preset level, while the non-limiter piston 266 and fluid chambers 278, 286, 288 cooperate to constitute an influencing device which influences the pressure restricting device so as to deteriorate the function of the pressure restricting device 268, 310, 314, 304. In the present embodiment, however, the pressure restricting device is adapted to limit the pilot pressure to the preset upper limit Pmrcut, that is, inhibit a further increase of the pilot pressure beyond the present upper limit, and the influencing device is adapted to completely inhibit the function of the pressure restricting device.

It will also be understood that the pressure restricting device 268, 310, 314, 304 of the limit valve 250 is functionally equivalent to the limit valve 190.

The influencing device including the non-limiter piston 266 permits the rear wheels 30, 32 to provide a comparatively large braking force with a comparatively higher hydraulic pressure applied to the rear wheel brake cylinders 34, 36 of the first brake system 38, when the front wheel brake cylinders 22, 24 are inoperative to brake the front wheels 18, 20 due to a failure of the second brake system 40. Accordingly, the limit valve 250 functions to reduce the amount of reduction in the overall braking force for braking the vehicle in the event of failure of the second brake system 40. In this respect, it is noted that the failure to brake the front wheels 18, 20 causes reduced load shift of the vehicle upon braking, and consequently reduced amount of reduction of the load component acting on the rear wheels 30, 32, whereby the braking force produced by the rear wheels is accordingly increased, to effectively minimize the braking distance of the vehicle in the event 0f failure of the second brake system 40.

Further, the present braking apparatus is capable of controlling the braking pressures applied to the wheel brake cylinders 22, 24, 34, 36, without using sensors for detecting the depression force on the brake pedal 10, pressures in the brake cylinders or deceleration value of the vehicle. That is, the hydraulic pressure of the accumulator 82 as the hydraulic pressure source is regulated according to the pilot pressure, which in turn depends upon or is proportion to the depression force acting on the brake pedal 10. Thus, the present apparatus is highly reliable in controlling the braking pressures for the wheel brake cylinders, in the absence of such sensors.

The present braking apparatus is characterized in that the hydraulic braking pressures to be applied to the wheel brake cylinders 22, 24, 34, 36 are principally controlled according to the pilot pressure based on the operating amount of the brake pedal 10, while the force motor 110 is used as secondary means for controlling the braking pressures during braking of the vehicle, namely, to effect an anti-lock control or braking-effect monitoring control of the braking pressures. Accordingly, a failure of an electric system including the force motor 110 will have a minimum influence on the braking performance of the braking apparatus. In this respect, the present braking apparatus has improved operating reliability. Further, the traction control of the driving wheels can be effected by the force motor 110, during acceleration of the vehicle.

The present braking apparatus is also characterized in that the boosting ratio of the master cylinder pressure Pm, that is, the ratio of the braking pressure in each wheel brake cylinder to the master cylinder pressure Pm can be adjusted by changing the ratio of the cross sectional area S1 of the pilot piston 140 to that S2 of the reaction piston 76. Therefore, it is not necessary to change the master cylinder and/or brake pedal depending upon the desired braking pressure to be applied to the wheel brake cylinders provided in the specific type or model of the vehicle in question. In other words, the present braking system is applicable to different types or models of the vehicle, without modification, and the cost of manufacture of the braking apparatus is reduced owing to the common use of the components such as the master cylinder.

Figure 8:
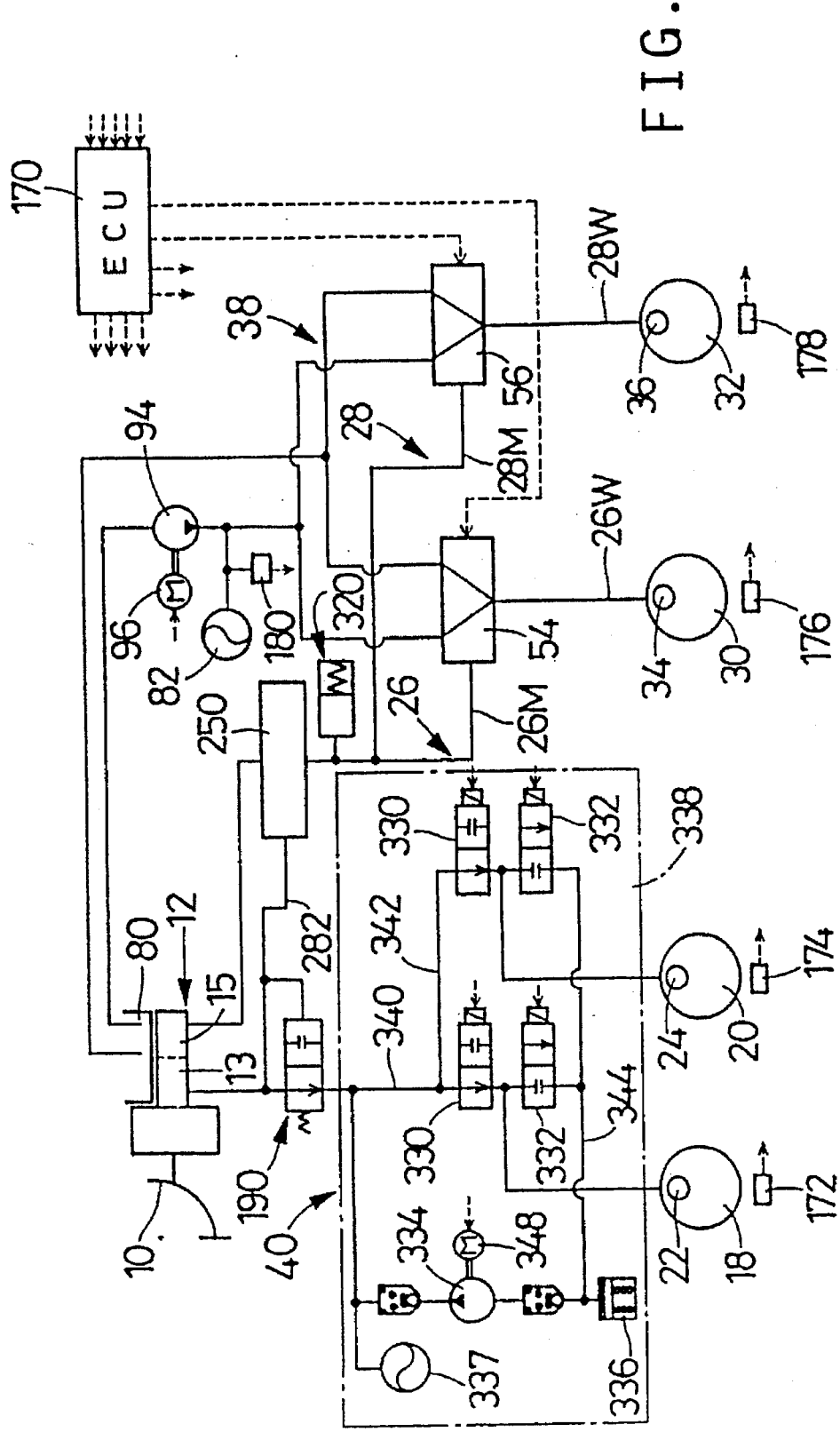
FIG. 8 is a schematic view showing another embodiment of the invention.

Referring next to FIG. 8, there will be described a second embodiment of the present invention. In the present embodiment, the hydraulic pressure control valves 50, 52 of the second brake system 40 are replaced by an anti-lock actuator 338 which includes solenoid-operated shut-off valves 330, 332, a pump 334, a reservoir 336 and an accumulator 337. The anti-lock actuator 338 is capable of effecting an anti-lock control of the hydraulic pressures to be applied to the front wheel brake cylinders 22, 24.

In the embodiment of FIG. 8, the front pressurizing chamber 13 is connected to the front wheel brake cylinders 22, 24 through respective fluid passages 340 and 342. In each of these fluid passages 340, 342, there is provided the solenoid-operated shut-off valve 330 which is normally open. The reservoir 336 is connected through a reservoir passage 344 to a portion of each fluid passage 340, 342 between the solenoid-operated valve 330 and the front wheel brake cylinder 22, 24. To the reservoir passage 344, there are connected the solenoid-operated shut-off valves 332 which are normally closed, such that the solenoid-operated shut-off valve 332 is connected between each solenoid-operated shut-off valve 330 and the reservoir 336. With the solenoid-operated shut-off valves 330, 332 suitably opened and closed, the anti-lock actuator 338 is selectively placed in one of three operating positions, namely, a pressure-increase position in which the front wheel brake cylinders 22, 24 communicate with the front pressurizing chamber 13, a pressure-decrease position in which the brake cylinders 22, 24 do not communicate with the pressurizing chamber 13 but communicate with the reservoir 336, and a pressure-hold position in which the brake cylinders 22, 24 do not communicate with the pressurizing chamber 13 and reservoir 336. In the pressure-increase and pressure-decrease positions, the hydraulic pressures in the brake cylinders 22, 24 can be raised and lowered, respectively. In the pressure-hold position, the hydraulic pressures in these brake cylinders are maintained at a level just before the pressure-hold position is established.

The pump 334 is driven by a motor 348 to pressurize the brake fluid which has been discharged from the front wheel brake cylinders 22, 24 into the reservoir 336. The brake fluid pressurized by the pump 334 is stored in the accumulator 337, and is delivered as needed to a portion of the fluid passage 340 between the solenoid-operated shut-off valve 330 and the limit valve 190. Thus, the anti-lock actuator 338 is of a fluid circulating type. The pressure of the fluid stored in the accumulator 337 is maintained at a level slightly higher than the preset level at which the limit valve 190 is closed.

The second brake system 40 incorporating the anti-lock actuator 338 is thus adapted to effect an anti-lock control of the hydraulic pressures to be applied to the front wheel brake cylinders 22, 24, by suitably controlling the operating states of the solenoid-operated shut-off valves 330, 332. As in the first embodiment, the limit valve 190 is closed when the front master cylinder pressure Pmf reaches the preset level Pmfcut. After the limit valve 190 is closed, the accumulator 337 functions as the hydraulic power source. The pump 334 may be relatively small-sized because the pump 334 is required to raise the brake fluid pressure in the accumulator 337 to a level lower than the front master cylinder pressure Pmf. Further, the anti-lock actuator 338 does not suffer from an abrupt change in the fluid pressures in the front wheel brake cylinders 22, 24 upon switching of the shut-off valves 330, 332 to selectively establish the pressure-increase, pressure-decrease and pressure-hold positions, whereby the braking pressures of the brake cylinders 22, 24 can be accurately controlled in the anti-lock manner.

In this second embodiment, a pressure relief valve is desirably provided between the delivery side of the pump 334 and the reservoir 336. In this case, the accumulator 337 may be eliminated. Further, the limit valve 190 may be eliminated. In this case, both the accumulator 337 and the relief valve may be eliminated.

Figure 9:
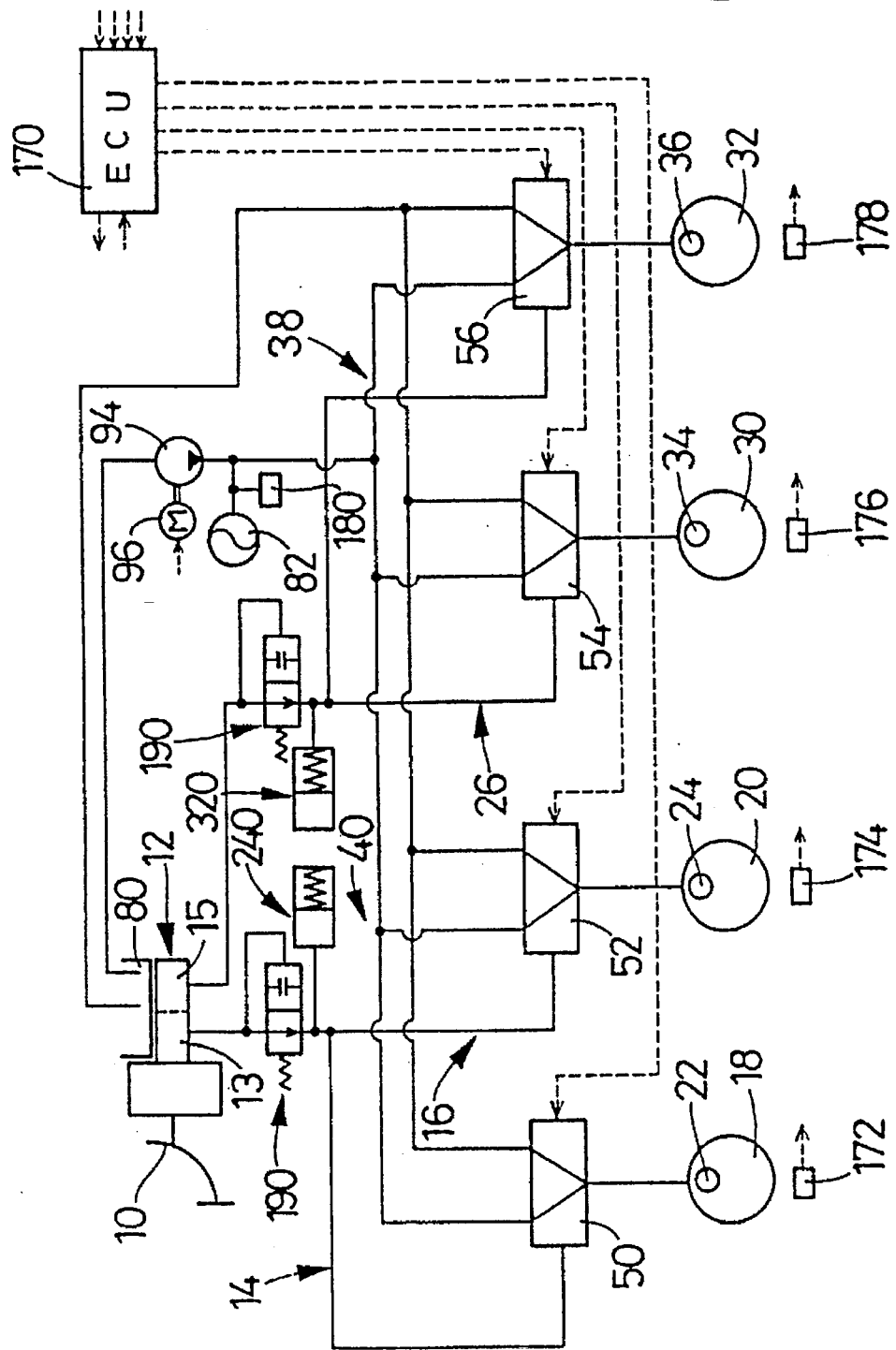
FIG. 9 is a schematic view showing a further embodiment of this invention.

While the first brake system 38 of the first and second embodiments described above uses the limit valve 250 with the non-limit function, the limit valve 250 may be replaced by the limit valve 190 as used in the second brake system 40, as shown in FIG. 9.

Figure 10:
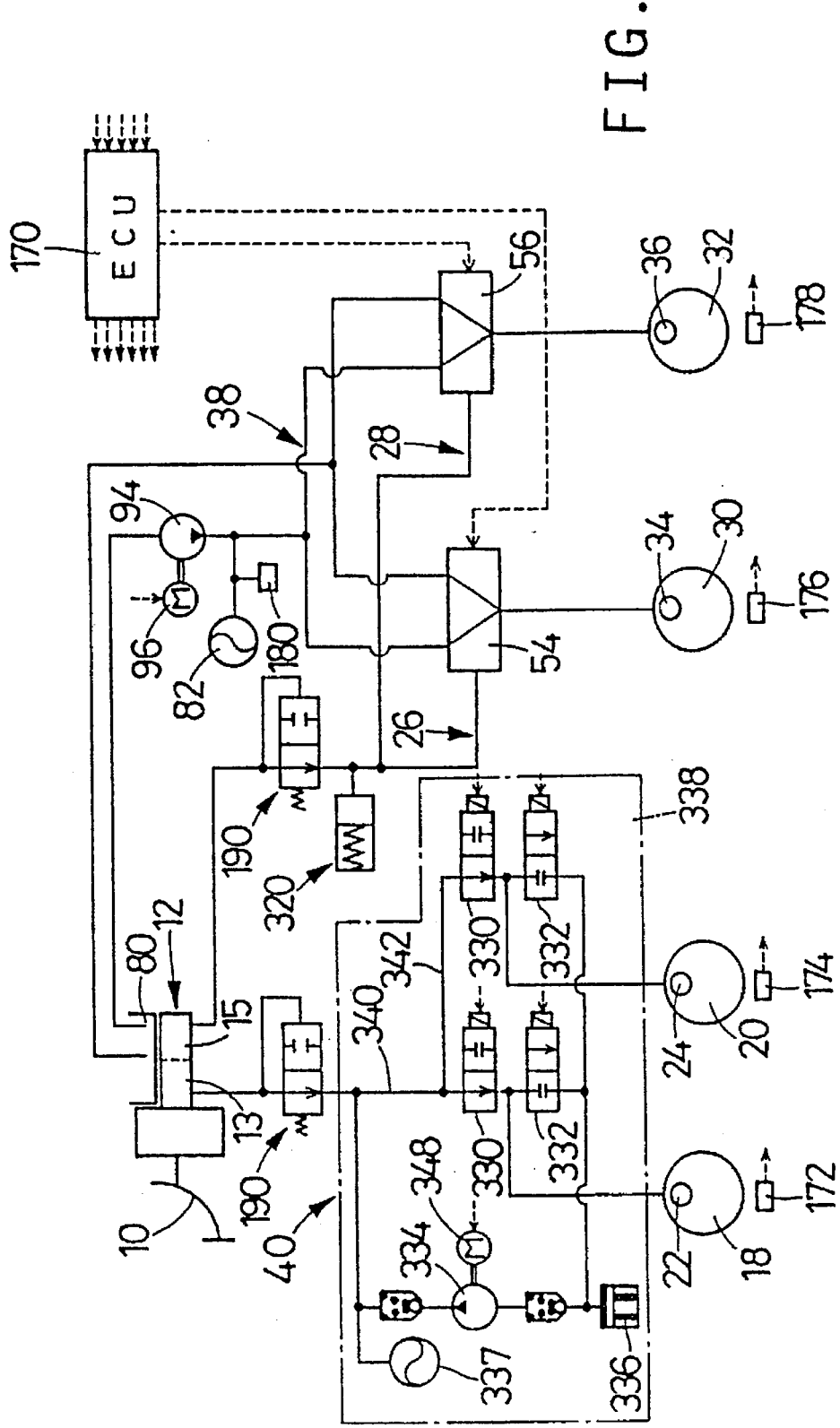
FIG. 10 is a schematic view showing a yet further embodiment of the invention.

The third embodiment of FIG. 9 which uses the two limit valves 190 (without the non-limit function) for the first and second brake systems 38, 40 may be modified so as to use the anti-lock actuator 338 in the second brake system 40, in place of the pressure control valves 50, 52, as shown in FIG. 10.

The limit valves 190, 250 used in the above embodiments is adapted to limit the pilot pressure in the pilot pressure chamber 142, by a retracting movement of the limiter piston 204, 268 which occurs when the master cylinder pressure Pm acting on the limiter piston 204, 268 exceeds a preset level. However, the pressure restricting device may be replaced by a combination of a solenoid-operated vale 370 and a hydraulic pressure sensor 372 as shown in FIG. 11.

Figure 11:
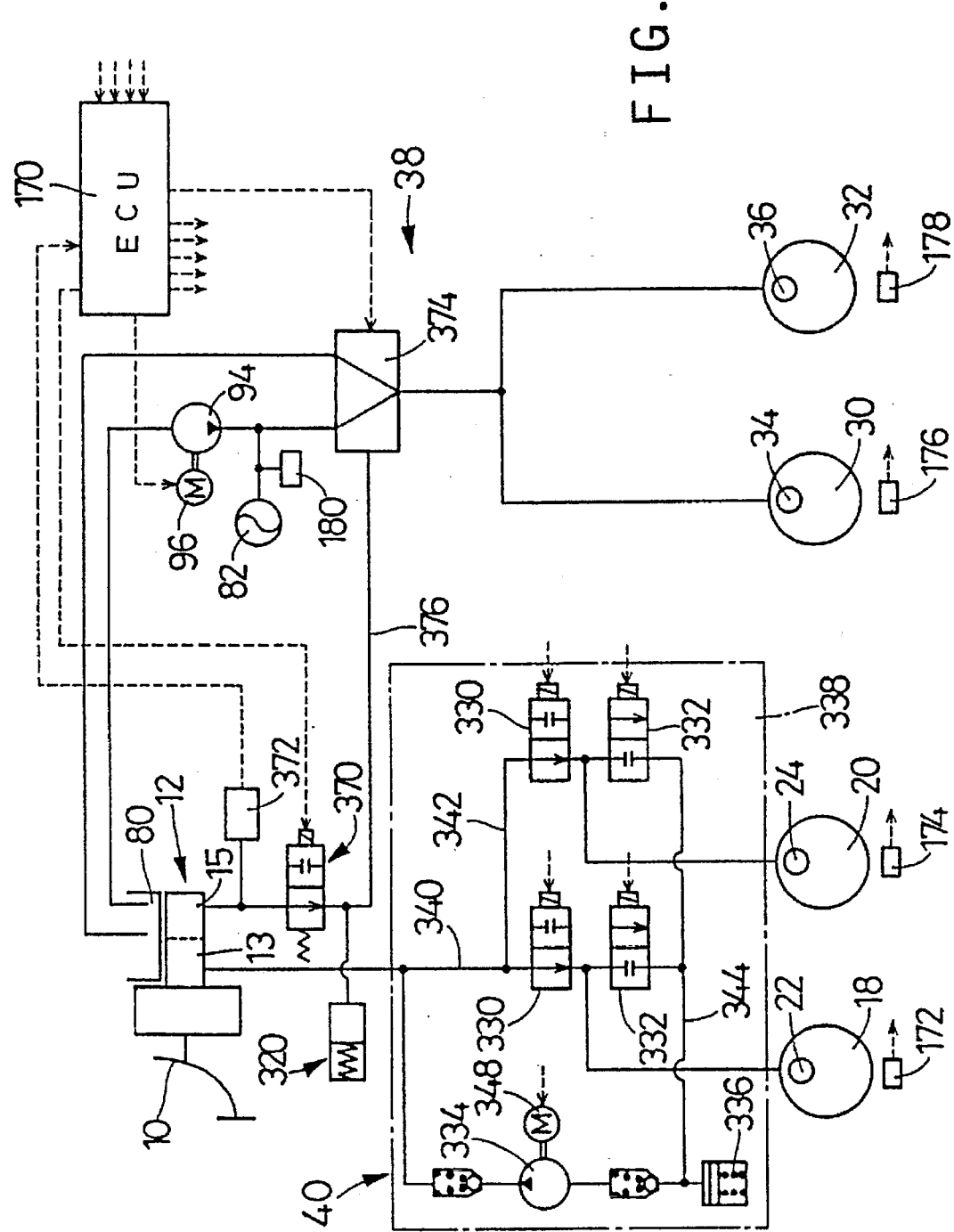
FIG. 11 is a schematic view showing still another embodiment of the present invention.

In the embodiment of FIG. 11, the second brake system 40 uses the anti-lock actuator 338, but does not use a limit valve, while the first brake system 38 uses one hydraulic pressure control valve 374 similar to the pressure control valves 50, 52, 54, 56. The pressure control valve 374 is commonly used for the two rear wheel brake cylinders 34, 36, that is, adapted to regulate the hydraulic pressures to be applied to the rear wheel brake cylinders 34, 36. The pressure control valve 374 is connected to the rear pressurizing chamber 15 of the master cylinder 12 through a fluid passage 376, which are provided with the solenoid-operated shut-off valve 370 and the hydraulic pressure sensor 372. The ECU 170 commands the shut-off valve 370 to be closed, for limiting the pilot pressure in the pilot pressure chamber in the pressure control valve 374, when the rear master cylinder pressure Pmr detected by the hydraulic pressure sensor 372 exceeds a preset level.

Figure 12:
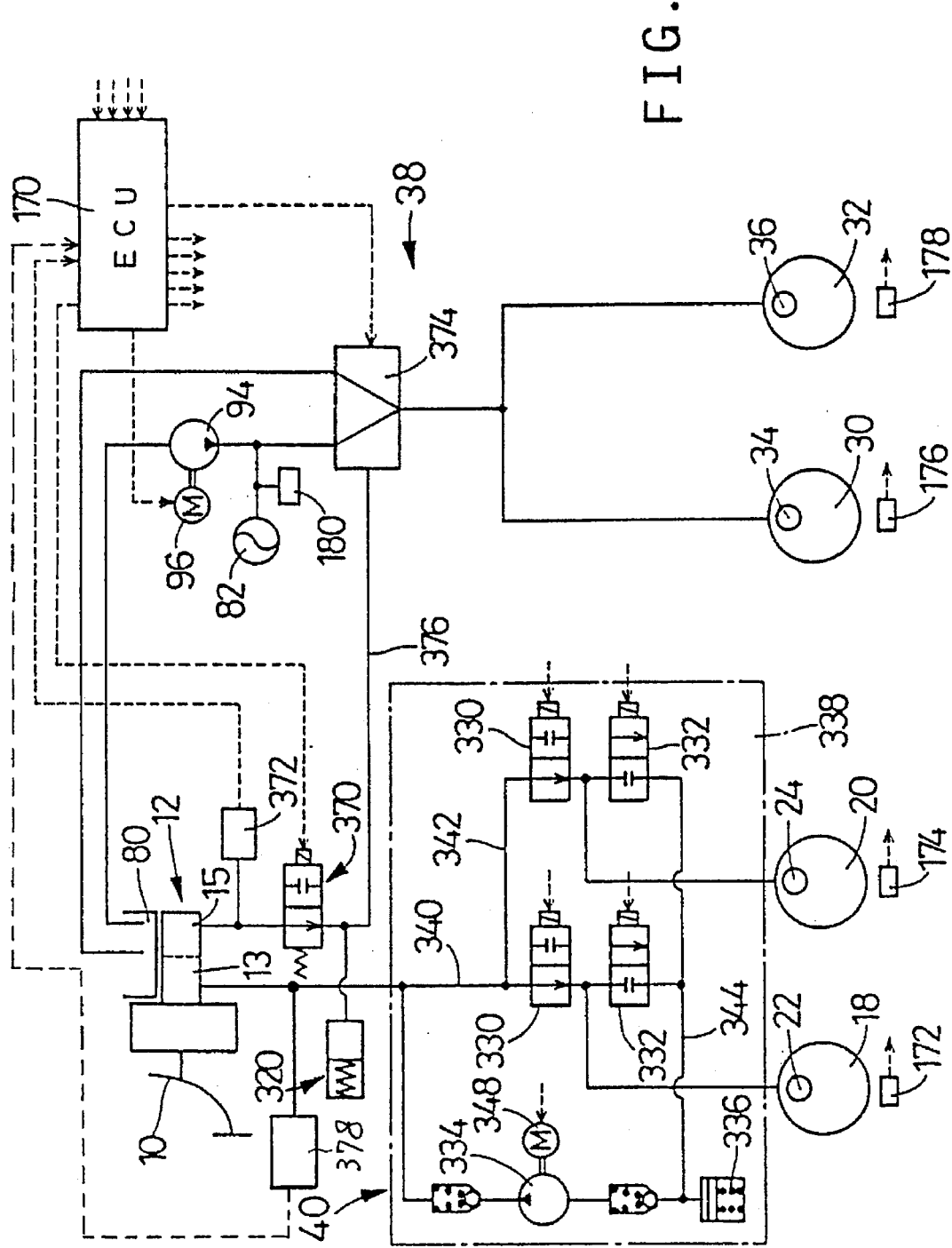
FIG. 12 is a schematic view showing yet another embodiment of the invention.

The embodiment of FIG. 11 may be modified so as to provide an influencing device for deteriorating the function of the pressure restricting device 170, 370, 372, more precisely, a device for inhibiting a closing action of the shut-off valve 370 in the event of a failure of the second brake system 40. An example of this modification is shown in FIG. 12, wherein a hydraulic pressure sensor 378 is provided to detect the front master cylinder pressure Pmf. The ECU 170 does not command the shut-off valve 370 to be closed even when the rear master cylinder pressure Pmr exceeds a preset level, if the absence of the front master cylinder pressure Pmf is detected by the sensor 378. In this case, the hydraulic pressure sensor 378 and the ECU 170 constitute the inhibiting device for inhibiting the closing action of the shut-off valve 370.

Figure 13:
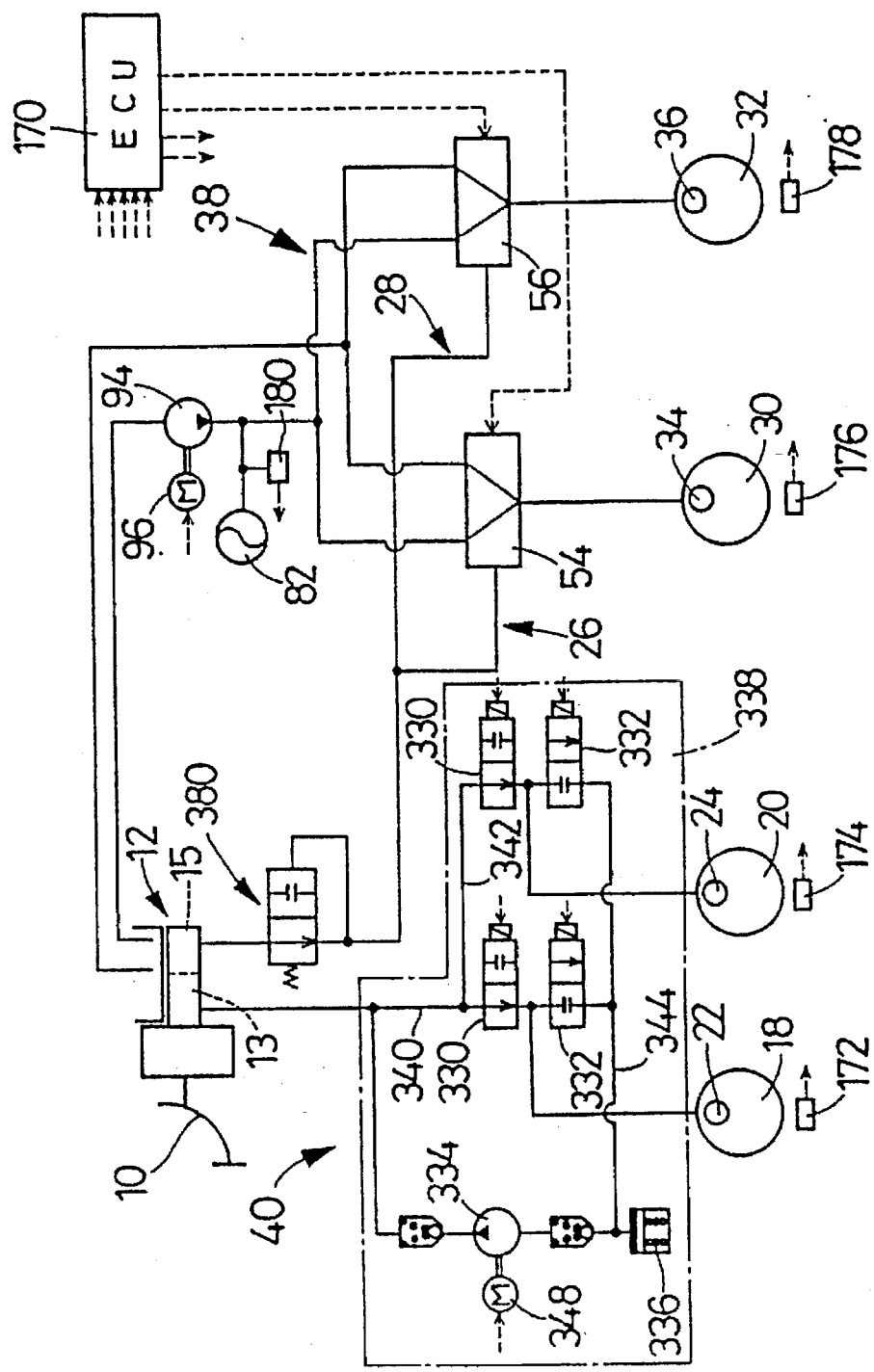
FIG. 13 is a schematic view showing a still further embodiment of the invention.

While the limit valves 190, 250 used in the embodiments of FIGS. 1 and 8–10 are pilot-operated shut-off valves adapted to be closed by the master cylinder pressure Pm acting on the limiter piston 204, 268 disposed on one side of the valve seat 228, 314 on the side of the master cylinder 12, the limit valve 190 and/or the limit valve 250 may be replaced by a pilot-operated shut-off valve in which a limiter piston is disposed on one side of a valve seat on the side of the hydraulic pressure control valve 50, 52, 54, 56. FIG. 13 shows an embodiment which uses such limit valve indicated at 380.

Figure 14:
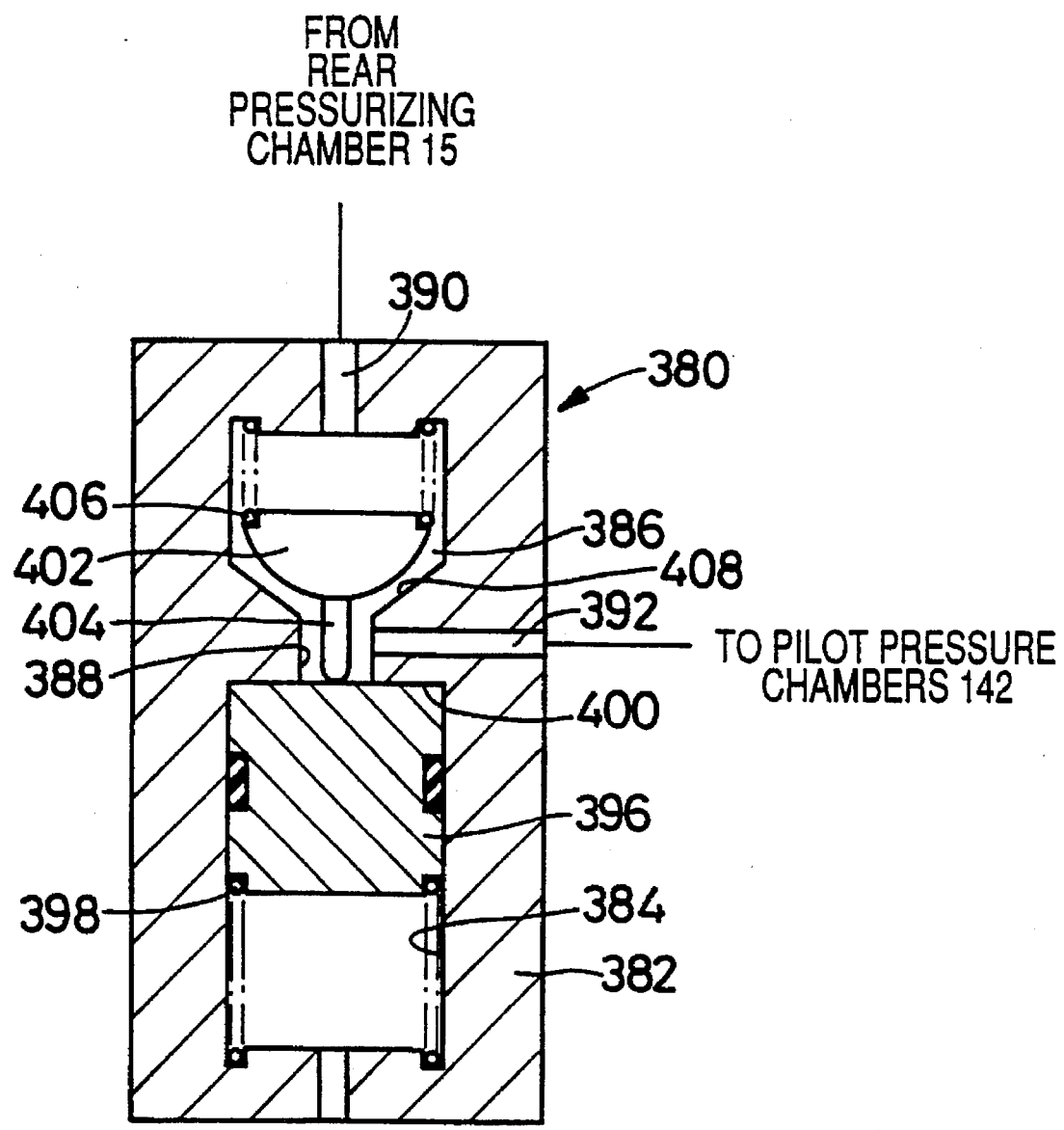
FIG. 14 is front elevational view in cross section of a modified limit valve used in the braking apparatus of FIG. 13.

The limit valve 380 used in the embodiment of FIG. 13 is constructed as shown in detail in FIG. 14. The limit valve 380 has a valve housing 382 in which there are concentrically formed a cylinder bore 384, a valve chamber 386, and a communication hole 388 communicating with the cylinder bore 384 and valve chamber 386. The valve chamber 386 is connected to the rear pressurizing chamber 15 through a port 390, while the communication hole 388 is connected to the pilot pressure chambers 142 of the pressure control valves 54, 56 through a port 392. A limiter piston 396 is fluid-tightly and slidably received in the cylinder bore 384, and is biased by a spring 398 toward an end face 400 of the bore 384 in which the communication hole 388 is open. A valve member 402 is disposed within the valve chamber 386. The valve member 402 has an extension 404 extending through the communication hole 388, and is biased by a spring 406 in a direction that causes the valve member to be seated on a valve seat 408.

When no rear master cylinder pressure Pmr is developed in the rear pressurizing chamber 15, the valve member 402 is spaced away from the valve seat 408 by the limiter piston 396 under the biasing action of the spring 398, whereby the rear pressurizing chamber 15 and the pilot pressure chambers 142 communicate with each other. When the rear master cylinder pressure Pmr in the chamber 15 exceeds a preset level, the limiter piston 396 is retracted against the biasing force of the spring 398, and the valve member 402 is seated on the seat 408, to thereby cut off the fluid communication between the rear pressurizing chamber 15 and the pilot pressure chambers 142 of the pressure control valves 54, 56.

When an anti-lock control of the braking pressures in the rear wheel brake cylinders 34, 36 is effected by energization and de-energization of the force motors 110 of the pressure control valves 54, 56, the brake fluids discharged from the pilot pressure chambers 142 due to retracting movements of the pilot pistons 140 are absorbed by the limit valve 380, with the retracting movement of the limiter piston 396 against the biasing force of the spring 398. Thus, the anti-lock control of the rear braking pressures can be smoothly performed in the first brake system 38. If the brake fluid leaks from the pilot pressure chambers 142, the limiter piston 396 is advanced due to reduction in the pressure in the pilot pressure chambers 142, whereby the limit valve 380 is opened, and the brake fluid is fed from the rear pressurizing chamber 15 to the pilot pressure chambers 142 through the open limit valve 380.

In the illustrated embodiments, the limit valves 190, 250, 380 are arranged to inhibit a further increase in the pilot pressure in the pilot pressure chambers 142 when the master cylinder pressure Pm reaches the preset level Pmfcut, Pmr-cut. In other words, the rate of increase in the pilot pressure is zeroed when the master cylinder pressure Pm reaches the preset level. However, the pressure restricting device using the limit valve 190, 250, 380 may use a proportioning valve adapted to reduce the rate of increase in the pilot pressure after the master cylinder pressure reaches the preset level.

Where one of the first and second brake systems 38, 40 uses such proportioning valve in the form of a proportioning by-pass valve, it is pobrake fluid from the mbrake fluid from the master cylinder 12 directly to the pressure control valves while by-passing a proportioning valve, if the other brake system fails to normally operate. Such proportioning valve and proportioning by-pass valve are well known in the art.

In the limit valve 250, the non-limiter piston 266 abuts on the limiter piston 268 to force the limiter piston 268 onto the end face of the intermediate-diameter portion 262 of the cylinder bore 254, for thereby holding the limit valve 250 open. However, the abutment of the non-limiter piston 266 onto the limiter piston 268 is not essential. In this respect, it is noted that a mere movement of the non-limiter piston 266 against the spring 304 toward the limiter piston 268 causes an increase of the biasing force of the spring 304 acting on the limiter piston 268, leading to an increase in the pressure at which the ball 310 is seated on the seat 314, whereby the pressure limiting function of the limiter piston 268 is restricted by the non-limiter piston 266. In the case where the limit valve 250 is constructed so as to be kept open upon failure of the second brake system 40 to supply the pressurized fluid to the front wheel brake cylinders 22, 24, the pressure limiting function of the limiter piston 268 is restricted due to the compression of the spring 304 and resulting increase of the closing pressure, when the hydraulic pressures in the front wheel brake cylinders 22, 24 become lower than the normal values. However, the pressure limiting function may be restricted only when no hydraulic pressures are present in the brake cylinders 22, 24.

Although the hydraulic braking apparatus according to each illustrated embodiment has the first brake system 38 and the second brake system 40, three or more brake systems may be provided. In any case where two or more brake systems are provided, each of these systems may include the hydraulic pressure control valves, electrically operated pressure regulating device and pressure restricting device, or it is alternatively possible that only a selected one or ones of those system include(s) those components while the other system or systems is/are adapted such that the master cylinder pressure is applied directly to the wheel brake cylinders. In the case where two or more brake systems include the hydraulic pressure control valves, electrically operated pressure regulating device and pressure restricting device, it is desirable that the pressure restricting device used in each brake system for the rear wheels 20, 32 be provided with an influencing device which influences or inhibits the pressure restricting function, as in the embodiments of FIGS. 1 and 8 which use the limit valve 250 with the non-limiter piston 266, and the embodiment of FIG. 12 which uses the hydraulic pressure sensor 378. Where the pressure restricting device with the influencing device is provided in two or more brake systems, these brake systems are defined as the first brake system, while the other brake system or systems whose hydraulic pressure triggers the influencing device is/are defined as the second brake system.

The hydraulic braking system according to the present invention may consist of a single brake system provided with the hydraulic pressure control valves, electrically controlled pressure regulating device and pressure restricting device.

In the limit valves 190, 250, the ball 224, 314 is fixed to the limiter piston 204, 268. However, the ball 224, 314 may be movably disposed in the valve chamber 196, 256. In this instance, the ball 224, 314 is biased toward the valve seat 228, 314, and the biasing force of the ball should be selected so as to hold the ball seated on the seat even after the master cylinder pressure Pm exceeds a preset level.

In the illustrated embodiments, the preset level Pmfcut, Pmrcut of the master cylinder pressure Pm, namely, the upper limit of the pilot pressure in the pilot pressure chamber 142 of the pressure control valves 50–56 is determined to be slightly higher than the level at which the braking pressure should be controlled in an anti-lock fashion. However, the upper limit of the pilot pressure may be otherwise determined. For instance, the upper limit may be changed depending upon the condition of the road surface on which the vehicle is running. The road surface condition may be detected by suitable means or determined by a suitable parameter which varies with a change in the friction coefficient of the road surface or a change in the road surface condition.

Figure 15:
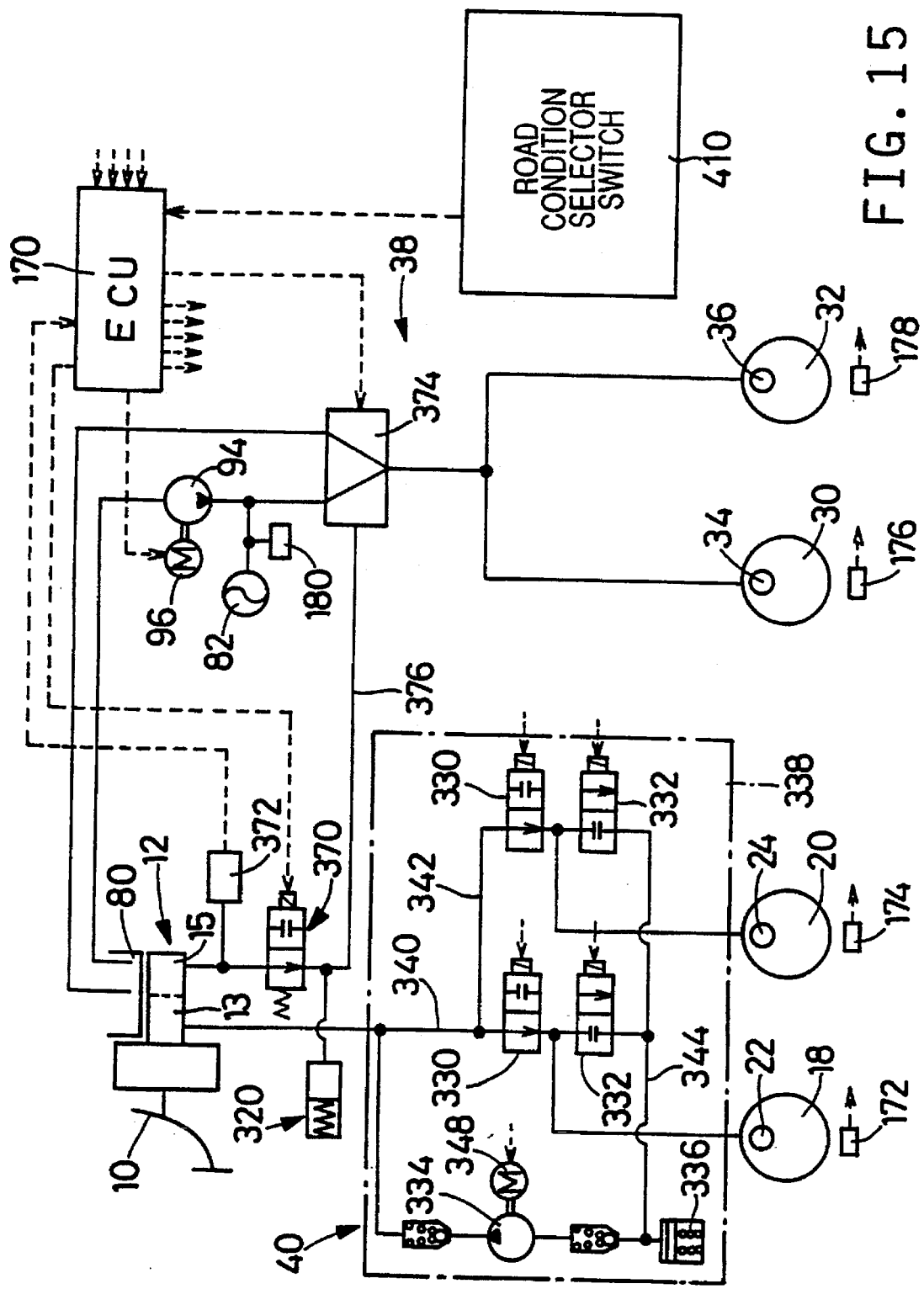
FIG. 15 is a schematic view showing a further embodiment of the invention.
Figure 16:
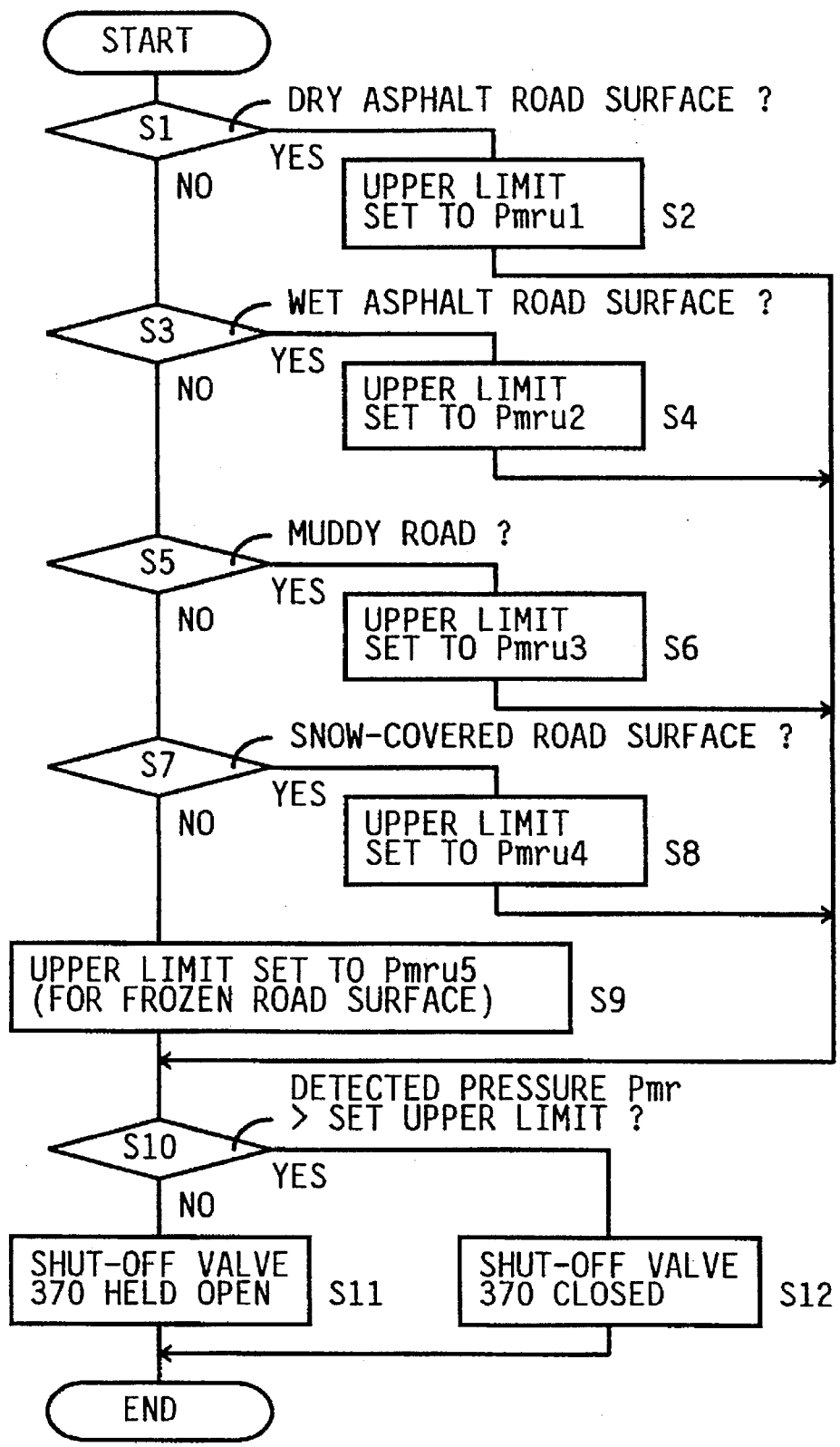
FIG. 16 is a flow chart illustrating a routine for controlling a shut-off valve valve used in the embodiment of FIG. 15, to change the upper limit of the pilot pressure applied to the rear hydraulic pressure control valves, depending upon the road surface condition on which the vehicle is running.

FIGS. 15 and 16 show an example of the braking apparatus in which the upper limit of the pilot pressure to be applied to the pressure control valve 374 for the rear wheel brake cylinders 34, 36 is changed according to the road surface condition. In this embodiment, the ECU 170 is adapted to receive an output signal of a road condition selector switch 410, as indicated in FIG. 15. This selector switch 410 is operated by the vehicle driver, to select one of five road surface conditions: 1) a dry asphalt road surface; 2) a wet asphalt road surface; 3) a muddy road surface; 4) a snow-covered road surface; and 5) a frozen road surface. One of these different road surface conditions is selected by the vehicle driver depending upon the actual road surface condition as observed by the driver.

The ECU 170 controls the solenoid-operated shut-off valve 370 according to a routine as illustrated in FIG. 16, on the basis of the output signals of the selector switch 410 and the hydraulic pressure sensor 372. Described more specifically, step S1 is initially implemented to determine whether the selector switch 410 is placed in the position corresponding to the dry asphalt road surface. If an affirmative decision (YES) is obtained in step S1, the control flow goes to step S2 in which the upper limit of the pilot pressure in the pilot pressure chamber 142 is set to a first predetermined value Pmru1. If a negative decision (NO) is obtained in step S1, the control flow goes to step S3 to determine whether the selector switch 410 is placed in the position corresponding to the wet asphalt road surface. If an affirmative decision (YES) is obtained in step S3, step S4 is implemented to set the upper limit to a second predetermined value Pmru2. Similarly, the upper limit is set to a third or fourth predetermined value Pmru3 or Pmru4 if the selector switch 410 is placed in the position corresponding to the muddy road surface or snow-covered road surface, respectively, by way of steps S5 and S6, or S7 and S8. If a negative decision (NO) is obtained in step S7, this means that the selector switch 410 is placed in the position corresponding to the frozen road surface, and the control flow goes to step S9 in which the upper limit is set to a fifth predetermined value Pmru5.

Steps S2, S4, S6, S8 and S9 are followed by step S10 to determine whether the rear master cylinder pressure Pmr detected by the hydraulic pressure sensor 372 is higher than the currently set value Pmru1, Pmru2, Pmru3, Pmru4 or Pmru5 of the upper limit of the pilot pressure. If a negative decision (NO) is obtained in step S10, the shut-off valve 370 is held in the open state. If an affirmative decision (YES) is obtained in step S10, the ECU 170 commands the shut-off valve 370 to be closed to thereby limit the pilot pressure in the pilot pressure chamber 142 to the currently set upper limit.

In the pressure control valves 50, 52, 54, 56, the reaction piston 76 is provided as feedback means, while the pilot piston 140 is provided as a member separate from the spool 66. However, the reaction piston 76 and/or the pilot piston 140 may be eliminated. In this case, the valve may be modified so that the pressure in the pilot port 144 acts directly on the spool 66, and/or a portion of the spool 66 may function as a reaction piston. Further, the valve may be modified so that a portion of the spool 66 functions as a pilot piston adapted to receive the master cylinder pressure.

While the force motor 110 is provided as an electrically controlled pressure regulating device, other electrically controlled devices such as a solenoid-operated device may be used to apply an electrically controlled force to the hydraulic pressure control valves.

While the illustrated embodiments use specific combinations of elements, the braking apparatus according to the present invention may be constructed with various other combinations of elements.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A hydraulic braking apparatus for braking a wheel of a vehicle, comprising:

a brake operating member;

a master cylinder having a pressurizing chamber for generating a hydraulic master cylinder pressure depending upon an operating force acting on said brake operating member;

a hydraulically operated brake having a wheel brake cylinder for braking the wheel;

a reservoir;

a hydraulic pressure source, independent of said master cylinder, for generating a hydraulic pressure;

a pressure control valve connected to said master cylinder, said wheel brake cylinder, said hydraulic pressure source and said reservoir, for controlling said hydraulic pressure of said hydraulic pressure source as a function of said master cylinder pressure applied as a pilot pressure to said pressure control valve, so that the controlled hydraulic pressure is applied as a braking pressure to said wheel brake cylinder;

an electrically controlled pressure regulating device for applying an electrically controlled force to said pressure control valve, to thereby regulate said braking pressure to be applied to said wheel brake cylinder; and a pressure restricting device disposed between said master cylinder and said pressure control valve, for reducing a rate of increase of said pilot pressure applied to said pressure control valve after said master cylinder pressure exceeds a preset level.

2. A hydraulic braking apparatus according to claim 1, wherein said pressure control valve has a pressure control member and said electrically controlled pressure regulating device comprises a force motor for producing an electrically controlled force which acts on said pressure control member of said pressure control valve, to thereby regulate said braking pressure to be applied to said wheel brake cylinder, said force motor having a permanent magnet and a moving coil.

3. A hydraulic braking apparatus according to claim 1, wherein said master cylinder has a plurality of mutually independent pressurizing chambers, and said hydraulically operated brake has a plurality of wheel brake cylinders for braking respective wheels of the vehicle, one of said pressurizing chambers and at least one of said wheel brake cylinders constituting part of a first brake system, while another of said pressurizing chambers and at least another of said wheel brake cylinders constituting part of a second brake system, said first brake system incorporating said pressure control valve; said electrically controlled pressure regulating device and said pressure restricting device, said braking apparatus further comprising an influencing device for deteriorating a function of said pressure restricting device when said first brake system fails to normally operate to apply said braking pressure to said at least one wheel brake cylinder thereof.

4. A hydraulic braking apparatus according to claim 3, wherein said pressure restricting device comprises a limit valve disposed between said master cylinder and said pressure control valve, for cutting fluid communication between said master cylinder and said pressure control valve to thereby inhibit said further increase of said pilot pressure after said master cylinder pressure exceeds said preset level, and wherein said restricting device comprises a non-limiter piston which receives an operating pressure to restrict a closing action of said limit valve.

5. A hydraulic braking apparatus according to claim 4, said limit valve includes a valve member operable to cut fluid communication between said master cylinder and said pressure control valve, and a limiter piston which receives said operating pressure to operate said valve member to cut said fluid communication, said non-limiter piston receiving said operating pressure in a direction opposite to a direction in which said limiter piston receives said operating pressure, said non-limiter piston abutting on said limiter piston to restrict an operation of said limiter piston.

6. A hydraulic braking apparatus according to claim 4, wherein said limit valve includes a valve member operable to cut fluid communication between said master cylinder and said pressure control valve, and a limiter piston which receives said operating pressure to operate said valve member to cut said fluid communication, said non-limiter piston receiving said operating pressure in a direction opposite to a direction in which said limiter piston receives said operating pressure, and being moved by said operating pressure toward said limiter piston, said restricting device further comprises a biasing member which provides a biasing force for restricting an operation of said limiter piston, said biasing force being increased as said non-limiter piston is moved toward said limiter piston.

7. A hydraulic braking apparatus according to claim 3, wherein said pressure restricting device comprises a solenoid-operated shut-off valve, a first pressure sensor for detecting said master cylinder pressure in said first brake system, and a shut-off valve controller for controlling said solenoid-operated shut-off valve on the basis of the master cylinder pressure detected by said pressure sensor, and wherein said restricting device comprises a second pressure sensor for detecting said master cylinder pressure in said second brake system, and a restrictor controller for commanding said shut-off controller so as to restrict a closing action of said shut-off valve.

8. A hydraulic braking apparatus according to claim 1, wherein said pressure restricting device comprises a device for zeroing said rate of increase of said master cylinder pressure and thereby inhibiting a further increase of said pilot pressure to be applied to said pressure control valve after the master cylinder pressure exceeds said preset level.

9. A hydraulic braking apparatus according to claim 8, wherein said pressure restricting device comprises a limit valve disposed between said master cylinder and said pressure control valve, for cutting fluid communication between said master cylinder and said pressure control valve to thereby inhibit said further increase of said pilot pressure after said master cylinder pressure exceeds said preset level.

10. A hydraulic braking apparatus according to claim 9, wherein said limit valve comprises a pilot-operated shut-off valve which receives as a pilot pressure said master cylinder pressure between said shut-off valve and said master cylinder.

11. A hydraulic braking apparatus according to claim 10, further comprising a fluid absorber disposed between said pilot-operated shut-off valve and said pressure control valve, for absorbing a pressurized fluid discharged from said shut-off valve upon operation of said electrically controlled pressure regulating device after said shut-off valve is closed.

12. A hydraulic braking apparatus according to claim 9, wherein said limit valve comprises a pilot-operated shut-off valve which receives as a pilot pressure a hydraulic pressure between said shut-off valve and said pressure control valve.

13. A hydraulic braking apparatus according to claim 12, wherein said pilot-operated shut-off valve includes:

a biasing member;

a limiter piston normally placed in an advanced position thereof under a biasing force of said biasing member, said limiter piston being retracted from said fully advanced position when a force based on said hydraulic pressure between said shut-off valve and said pressure control valve exceeds said biasing force of said biasing member; and a valve member movable between an open position and a closed position, said valve member being held in said open position when said limiter piston is placed in said fully advanced position, and moved to said closed position when said limiter piston is retracted away from said fully advanced position, said limiter piston being further retractable even after said valve member has moved to said closed position.

14. A hydraulic braking apparatus according to claim 9, wherein said preset level to which said pilot pressure to be applied to said pressure control valve is limited by said limit valve is determined to be a value corresponding to a minimum value of said braking pressure required to stop the vehicle with a shortest braking distance where the vehicle runs on a dry asphalt road surface.

15. A hydraulic braking apparatus according to claim 9, further comprising a device for changing said preset level to which said pilot pressure is limited by said limit valve, depending upon a condition of a road surface on which the vehicle runs.

16. A hydraulic braking apparatus according to claim 1, further comprising:

a braking slip detecting device for detecting a slipping condition of said wheel on a road surface during an operation of said hydraulically operated brake; and an anti-lock control means for controlling said electrically controlled pressure regulating device, on the basis of said slipping condition of the wheel detected by said slip detecting device, so as to optimize the slipping condition of the wheel.

17. A hydraulic braking apparatus according to claim 1, further comprising:

an acceleration slip detecting device for detecting a slipping condition of said wheel on a road surface while said hydraulically operated brake is not operated; and control means for controlling said electrically controlled pressure regulating device, on the basis of said slipping condition of the wheel detected by said acceleration slip detecting device, so as to optimize the slipping condition of the wheel.

18. A hydraulic brake apparatus according to claim 1, wherein said electrically controlled pressure regulating device comprises a force motor for producing an electrically controlled force which acts on a pressure control member of said pressure control valve, to thereby regulate said braking pressure to be applied to said wheel brake cylinder, said force motor having a permanent magnet and a moving coil, said hydraulic braking apparatus further comprises:

a brake operation detecting device for detecting an operating amount of said brake operating member;

a braking effect detecting device for detecting a braking effect given to the vehicle by said hydraulically operated brake; and control means for controlling said force motor of said electrically controlled pressure regulating device so that said braking effect detected by said braking effect detecting device coincides with a desired value determined by said operating amount of said brake operating member detected by said brake operation detecting device.

19. A hydraulic braking apparatus for braking a wheel of a vehicle, comprising:

a brake operating member;

a master cylinder having a pressurizing chamber for generating a hydraulic master cylinder pressure depending upon an operating force acting on said brake operating member;

a hydraulically operated brake having a wheel brake cylinder for braking the wheel;

a reservoir;

a hydraulic pressure source, independent of said master cylinder, for generating a hydraulic pressure;

pressure control valve connected to said master cylinder, said wheel brake cylinder, said hydraulic pressure source and said reservoir, for controlling said hydraulic pressure of said hydraulic pressure source as a function of said master cylinder pressure applied as a pilot pressure to said pressure control valve, so that the controlled hydraulic pressure is applied as a braking pressure to said wheel brake cylinder;

said pressure control valve having a pressure control member, a reaction piston, an output port connected to said wheel brake cylinder, a high-pressure port connected to said hydraulic pressure source and a low-pressure port connected to said reservoir, said pressure control member including a spool for selective communication of said output port with said high-pressure and low-pressure ports, said reaction piston receiving the hydraulic pressure in said output port and applying to said spool a feedback force proportional to the hydraulic pressure in said output port; and an electrically controlled pressure regulating device comprising an electromagnetic actuator for producing an electrically controlled force which acts on said pressure control member of said pressure control valve, to thereby regulate said braking pressure applied to said wheel brake cylinder.

20. A hydraulic braking apparatus according to claim 19, wherein said pressure control valve includes a pilot piston which receives said master cylinder pressure and applies to said spool a pilot force proportional to said master cylinder pressure.

21. A hydraulic braking apparatus according to claim 20, wherein said reaction piston has a first pressure-receiving cross sectional area receiving the hydraulic pressure in said output port, and said pilot piston has a second pressure-receiving cross sectional area which receives said master cylinder pressure and which is different from said first pressure-receiving cross sectional area.

* * * * *